United States Patent
Kobayashi

(10) Patent No.: US 6,873,812 B2
(45) Date of Patent: Mar. 29, 2005

(54) IMAGE FORMING APPARATUS FOR FORMING IMAGE ON DIFFERENT SIZE PAGES OF BOOKLET AND IMAGE FORMING METHOD THEREOF

(75) Inventor: Misao Kobayashi, Kofu (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/445,078

(22) Filed: May 27, 2003

(65) Prior Publication Data

US 2003/0223780 A1 Dec. 4, 2003

(30) Foreign Application Priority Data

May 28, 2002 (JP) ........................................ 2002-154295
Aug. 30, 2002 (JP) ........................................ 2002-254223
Aug. 30, 2002 (JP) ........................................ 2002-254582

(51) Int. Cl.[7] ............................................. G03G 15/04
(52) U.S. Cl. ........................................ 399/193; 399/196
(58) Field of Search ................................ 399/182, 193, 399/194, 196, 197, 407, 408

(56) References Cited

U.S. PATENT DOCUMENTS

| 4,334,765 | A | * | 6/1982 | Clark ........................ 399/194 |
| 4,674,864 | A | * | 6/1987 | Stakenborg et al. ........ 399/193 |
| 4,819,029 | A | * | 4/1989 | Ito .............................. 399/193 |
| 4,941,017 | A | * | 7/1990 | Mishima et al. ............ 399/193 |
| 5,150,224 | A | * | 9/1992 | Mizude et al. .......... 399/196 X |
| 5,752,154 | A | * | 5/1998 | Maruyama et al. ......... 399/407 |
| 5,839,033 | A | * | 11/1998 | Takahashi et al. ...... 399/197 X |
| 6,094,552 | A | * | 7/2000 | Haneda et al. .............. 399/193 |

FOREIGN PATENT DOCUMENTS

| JP | 08-164686 | * | 6/1996 |
| JP | 2000-072320 | * | 3/2000 |

* cited by examiner

*Primary Examiner*—Sandra L. Brase
(74) *Attorney, Agent, or Firm*—Manabu Kanesaka

(57) ABSTRACT

An image forming apparatus forms an image on a page of a booklet having different size pages. The image forming apparatus includes a setting unit for determining an image forming area on a page having the smallest size; a magnification modification unit for modifying a magnification of an original image on an original document so that the original image fits the image forming area set by the setting unit; and an image forming unit for forming the original image at the magnification modified by the magnification modification unit on the different size pages.

23 Claims, 26 Drawing Sheets

RIGHT TO LEFT PAGE TURNING

LEFT TO RIGHT PAGE TURNING

IMAGE FORMING APPARATUS FOR FORMING IMAGE ON DIFFERENT SIZE PAGES OF BOOKLET AND IMAGE FORMING METHOD THEREOF

BACKGROUND OF THE INVENTION AND RELATED ART STATEMENT

The present invention relates to an image forming apparatus and an image forming method, and more particularly, to an image forming apparatus and an image forming method for producing a booklet composed of different size pages.

Japanese Patent Publication (TOKKAI) No. 2000-72320 has discloses a sheet post-processing device (finisher). The sheet post-processing device performs a saddle stitching operation on a plurality of sheets having an image recorded thereon and discharged from an image forming apparatus, and folds the sheets along a stitched portion thereof to bind a booklet. The sheet post-processing device performs the saddle stitching operation and the folding operation with edges of the sheets aligned. The finished booklet becomes neat with the edges of the sheets aligned and with all pages having the same size.

As more and more handicapped and aged people participate in social and corporate activities, a variety of efforts are made to provide an environment friendly to these people in corporate offices and government offices, for example.

A booklet bound by a conventional sheet post-processing device has typically aligned edges. The booklet with the page edges neatly aligned looks good, but it is difficult for people who are forced to use a single hand to open pages, for example.

Japanese Patent Publication (TOKKAI) No. 8-164686 has disclosed a sheet post-processing device for producing a booklet providing an easy page turning feature. The booklet is produced by performing a saddle stitching process or a folding process on a sheet stack with edges of the sheets successively shifted from one page to a next page.

The booklet having the easy page turning feature with the edges of the pages shifted presents the following problem. In such a booklet, an area of each page is different from page to page (see FIG. 20).

When an image having a size for a booklet having the same sheet size is formed on the pages having different areas, the image may be formed out of a page having a small area. As shown in FIG. 21(B), when images are formed next to each other on the same surface of a sheet at a position away from an edge opposite to a stitch line (fold line) by a predetermined distance m, the image is positioned out of the page one having the smallest area. As shown in FIG. 21(C), when the images are formed next to each other on the same surface of a sheet at a position away from a stitch line (fold line) by a predetermined distance m, the image is positioned out of the page one having the smallest area and a part of the image is cut.

In the booklet having the easy to turn page feature, the edges of the pages are shifted. Therefore, it is easy and reliable to turn the pages with fingers holding the shifted portion. Since there is a predetermined shift between, for example, page one and page three, it is easy to find a borderline between the two pages and a position on which the user can place a finger to turn a page.

However, in the case that the images are formed on the shifted portion of each page, it is difficult to find the borderline between the pages and the position on which the user can place a finger to turn a page. Further, in an aesthetic point of view, a booklet with images formed on the shifted portion does not look good.

The images may be formed on each page with an extra space from the edge of the page having a width equal to or larger than a shift to prevent the image formed out of the shifted portion in the booklet. In that case, however, when the images are formed on an odd-number page and an even-number page, corresponding to the front and back of one sheet, at positions away from the edge of each page by a distance equal to or longer than the shift, the user can not find the image on the even-number page, i.e. the back of the one sheet, without opening pages wider than in a booklet having all pages aligned, thereby causing an inconvenience to the reader.

Accordingly, it is an object of the present invention to provide an image forming apparatus and an image forming method for forming images on each page of a booklet having different size pages without cutting the images on any page.

It is another object of the present invention to provide an image forming apparatus and an image forming method for making a booklet in which it is easy to turn the different size pages.

In view of above mentioned problems, it is yet another object of the present invention to provide an image forming apparatus and an image forming method for producing a booklet having different size pages with edges of the pages shifted by a predetermined distance to allow a reader to quickly recognize the images formed on each page.

Further objects and advantages of the invention will be apparent from the following description of the invention.

SUMMARY OF THE INVENTION

The first aspect of the present invention provides an image forming apparatus for forming an image on a page of a booklet having different size pages. The image forming apparatus includes a setting unit for determining an image forming area on a page having the smallest size; a magnification modification unit for modifying a magnification of an original image on an original document so that the original image fits the image forming area set by the setting unit; and an image forming unit for forming the original image modified by the magnification modification unit on the different size pages.

In the first aspect of the present invention, the setting unit sets the image forming area on the page having the smallest size. The magnification modification unit modifies the magnification of the original image so that the original image at the modified magnification fits the area set by the setting unit. The image forming unit forms the original image, at the magnification thereof modified by the magnification modification unit, on each of the different size pages. Since the original image is magnified to fit the image forming area of the page having the smallest size, the images are formed on respective pages without being placed outside the pages. Therefore, the images are formed without missing any portion of the images on the pages of the booklet formed of the different size pages.

In the first aspect of the present invention, the setting unit may set the image forming area of the page having the smallest size excluding margin thereof. The image forming apparatus may further include a position control unit for controlling a position of the original image at the magnification modified by the magnification modification unit so that the original image at the modified magnification is placed on a predetermined position on each of the different size pages. The position control unit may control the position of the original image at the magnification modified by the magnification modification unit so that the original images at the modified magnification are formed next to each other on a sheet forming the booklet.

In the first aspect of the present invention, the position control unit may control the position of the original image at the magnification modified by the magnification modification unit so that the original image at the modified magnification is placed away by a predetermined spacing from a free edge of each of the different size pages to be subjected to at least one of a stitching process and a folding process. The position control unit may control the position of the original image at the magnification modified by the magnification modification unit so that the original image at the modified magnification is placed away by a predetermined spacing from an edge opposite to a free edge of each of the different size pages to be subjected to at least one of a stitching process and a folding process.

The second aspect of the present invention provides an image forming method including the steps of setting an image forming area on a page having the smallest size in a booklet including different size pages, modifying a magnification of an original image of an original document so that the original image at the modified magnification fits the image forming area, and forming the original image at the magnification modified by the magnification modification unit on each of the different size pages.

According to the third aspect of the present invention, an image forming apparatus includes a sheet post-processing device including a placement unit for placing discharged sheets; an offset unit for successively shifting the sheets with one edge of one sheet shifted from a corresponding edge of a next sheet by a predetermined distance and the other edge opposite to the one edge of the one sheet shifted from the other corresponding edge of the next sheet by the predetermined distance to form a sheet stack; and a post-processing unit for performing a folding process and/or a saddle stitching process on the sheet stack with the sheets shifted by the offset unit. The image forming apparatus further includes a storage unit for storing input image data; an image forming unit for forming an image in accordance with the image data stored in the storage unit on pages arranged on the same side of a sheet with a fold line and/or a stitch line formed by the post-processing unit in between; and a control unit for controlling the image forming unit so that the image forming unit forms an image on each page at a position away from the one edge or the other edge of the sheet by a space equal to or larger than the predetermined distance.

In the third aspect of the present invention, the storage unit stores the input image data, the image forming unit forms the image in accordance with the image data stored in the storage unit on the pages on the same side of the sheet with the fold line and/or stitch line formed by the post-processing device in between, and the control unit controls the image forming unit so that the image forming unit forms the image on each page at the position away from the one edge or the other edge of the sheet by the space equal to or larger than the predetermined distance. The offset unit successively shifts the discharged sheets on the placement means with one edge of one sheet shifted from a corresponding edge of a next sheet by a predetermined distance and the other edge opposite to the one edge of the one sheet shifted from the other corresponding edge of the next sheet by the predetermined distance. The post-processing unit performs the folding process and/or the saddle stitching process on the sheet stack shifted by the offset unit.

In the third aspect of the present invention, the control unit controls the image forming unit so that the image forming unit forms the image on each page at the position away from the one edge or the other edge of the sheet by the space equal to or larger than the predetermined distance. Since no images are formed on the shifted portion of each page, each borderline between the pages distinctly appears. The reader easily finds a position where to touch with a finger when turning the page.

In the third aspect of the present invention, the control unit may control the image forming unit so that the image forming unit forms the image at a position away from the one edge or the other edge of the odd-number pages of the sheet stack which is to be folded at the fold line and/or the stitch line in such a manner that the one edge of the innermost sheet looks projected out of the other edge thereof.

According to the fourth aspect of the present invention, an image forming method includes the steps of detecting a shift by which one edge of one sheet is shifted from a corresponding edge of a next sheet in a booklet to include different size pages, and forming an image at a position away from the one edge by a space equal to or larger than the offset.

In the fourth aspect of the present invention, the shift by which the one edge of the one sheet is shifted from the corresponding edge of the next sheet in a booklet to include different size pages is detected in the detecting step. In the image forming step, the image is formed at the position away from the one edge by the space equal to or larger than the offset.

In the fourth aspect of the present invention, the image is formed at the position away from the one edge by the space equal to or longer than the offset in the image forming step. Therefore, no images are formed on the shifted portion of each page of the booklet composed of the different size pages. Each borderline between the pages distinctly appears, and the reader easily finds a position to touch with a finger when turning the pages. The image forming step is preferably carried out on each odd-number page of the booklet.

According to the fifth aspect of the present invention, an image forming apparatus includes a sheet post-processing device including a placement unit for placing discharged sheets; an offset unit for successively shifting the sheets with one edge of one sheet shifted from a corresponding edge of a next sheet by a predetermined distance and the other edge opposite to the one edge of the one sheet shifted from the other corresponding edge of the next sheet by the predetermined distance to form a sheet stack; and a post-processing unit for performing a folding process and/or a saddle stitching process on the sheet stack with the sheets shifted by the offset unit. The image forming apparatus further includes a storage unit for storing input image data; an image forming unit for forming an image in accordance with the image data stored in the storage unit on pages on the same side of a sheet with a fold line and/or a stitch line formed by the post-processing unit in between; and a control unit for controlling the image forming unit so that the image forming unit forms the image at a position on an odd-number page different from that on an even-number page when the sheet stack is folded at the fold line and/or the stitch line in such a manner that one edge of the innermost sheet looks projecting out of the other edge.

In the fifth aspect of the present invention, the storage unit stores the input image data. The image forming unit forms the image in accordance with the image data stored in the storage unit on the pages on the same side of the sheet with the fold line and/or the stitch line formed by the post-processing device in between. The control unit controls the image forming unit so that the image forming unit forms the image at the position on the odd-number page different from that on the even-number page when the sheet stack is folded at the fold line and/or the stitch line in such a manner that the one edge of the innermost sheet looks projecting out of the other edge.

In the fifth aspect of the present invention, the offset unit successively shifts the discharged sheets on the placement means with the one edge of the one sheet shifted from the corresponding edge of the next sheet by a predetermined distance and the other edge opposite to the one edge of the one sheet shifted from the other corresponding edge of the next sheet by the predetermined distance. The post-processing unit performs the folding process and/or the saddle stitching process on the sheet stack with the sheets shifted by the offset unit.

In the fifth aspect of the present invention, the control unit controls the image forming unit to form the image position on the odd-number page different from that on the even-number page when the sheet stack is folded at the fold line and/or the stitch line in such a manner that the one edge of the innermost sheet looks projecting out of the other edge. Therefore, the images are formed at appropriate positions on the odd-number pages and the even-number pages. As for odd-number pages, it is easy to find a position to touch with a finger when turning the pages because each borderline between the pages distinctly appears. The reader quickly views the content of each image on even-number pages when turning the pages without widely opening the even-number pages.

In the fifth aspect of the present invention, the control unit preferably controls the image forming unit so that a space between one edge or the other edge of an even-number page and the image thereon has a width smaller than a space between one edge or the other edge of an odd-number page and the image thereon.

In the fifth aspect of the present invention, the sheet post-processing means preferably performs the folding process and/or the stitching process at a position closer to the other edge than to the one edge as the fold line and/or the stitch line.

According to the sixth aspect of the present invention, an image forming method includes an image forming position setting step for setting an image forming position on an odd-number page to be different from that on an even-number page in a booklet including different size pages with an edge of one page shifted from a corresponding edge of a next page; and an image forming step of forming images on the odd-number page and the even-number page in accordance with the image forming positions set in the image forming position setting step.

In the sixth aspect of the present invention, in the image forming position setting step, the image forming position on the odd-number page is set to be different from that on the even-number page in the booklet including the different size pages with the edge of the one page shifted from the corresponding edge of the next page. In the image forming step, the images are formed on the odd-number page and the even-number page in accordance with the image forming positions set in the image forming position setting step.

In the sixth aspect of the present invention, the images are formed at appropriate positions on the odd-number pages and the even-number pages. Therefore, it is easy to find a position to touch with a finger when turning the pages because each borderline between the pages distinctly appears. The reader quickly views the content of each image on even-number pages when turning the pages without widely opening the even-number pages.

In the sixth aspect of the present invention, the image forming position on the even-number page may be set closer to the one edge of the page than the image forming position on the odd-number page.

BRIEF DESCRIPTION OF THE DRAWINGS

FIGS. 14(A) and 14(B) are views showing a relationship among an image forming area on a sheet where original images at a modified magnification can be formed next each other, a size of the smallest size page, margins on the page, and spaces on the page, wherein FIG. 14(A) shows an opposed-edge referenced image forming mode, and FIG. 14(B) shows a stitch-line (fold-line) referenced image forming mode;

FIGS. 15(A)–15(C) are views showing an operation of an offset unit relative to the first sheet, wherein FIG. 15(A) is a view showing an operation No. 1, FIG. 15(B) is a view showing an operation No. 2, and FIG. 15(C) is a view showing an operation No. 3;

FIGS. 16(A)–16(C) are views showing operations of the offset unit relative to the second sheet continued from the first sheet, wherein FIG. 16(A) is a view showing an operation No. 4, FIG. 16(B) is a view showing an operation No. 5, and FIG. 16(C) is a view showing an operation No. 6;

FIGS. 17(A) and 17(B) are views showing operations of the offset unit relative to the third sheet continued from the second sheet, wherein FIG. 17(A) is a view showing an operation No. 7, and FIG. 17(B) is a view showing an operation No. 8;

FIGS. 18(A) and 18(B) are views of the folding unit in a offset saddle stitch mode and a offset saddle mode, wherein FIG. 18(A) is a side view of the folding unit in a state prior to the sheet stack folding operation, and FIG. 18(B) is a side view of the folding unit during the sheet stack folding operation;

FIGS. 23(A)–23(C) are views schematically showing a position of each sheet of a booklet composed of different size pages with reference to a stitch line or a fold line, wherein FIG. 23(A) shows a page corresponding to each sheet when a both-side printing mode is selected, FIG. 23(B) shows a case that original images formed next to each other on one side of the first sheet, and FIG. 23(C) shows a case that the original images are formed next to each other on one side of the second sheet;

FIGS. 25(A)–25(C) are views schematically showing a position of each sheet of a booklet composed of different size pages with reference to a stitch line or a fold line, wherein FIG. 25(A) shows a page corresponding to each sheet when the both-side printing mode is selected, FIG. 25(B) shows a case that original images formed next to each other on one side of the first sheet, and FIG. 25(C) shows a case that the original images are formed next to each other on one side of the second sheet; and FIGS. 26(A)–26(C) are views schematically showing a position of each sheet of a booklet composed of different size pages with reference to a stitch line or a fold line, wherein FIG. 26(A) shows a page corresponding to each sheet when a both-side printing mode is selected, FIG. 26(B) shows a case that original images are formed next to each other on one side of the first sheet, and FIG. 26(C) shows a case that the original images are formed next to each other on the other side of the first sheet.

DETAILED DESCRIPTION OF PREFERRED EMBODIMENTS

Hereunder, embodiments of the present invention will be explained with reference to the accompanying drawings.

Figure 1:
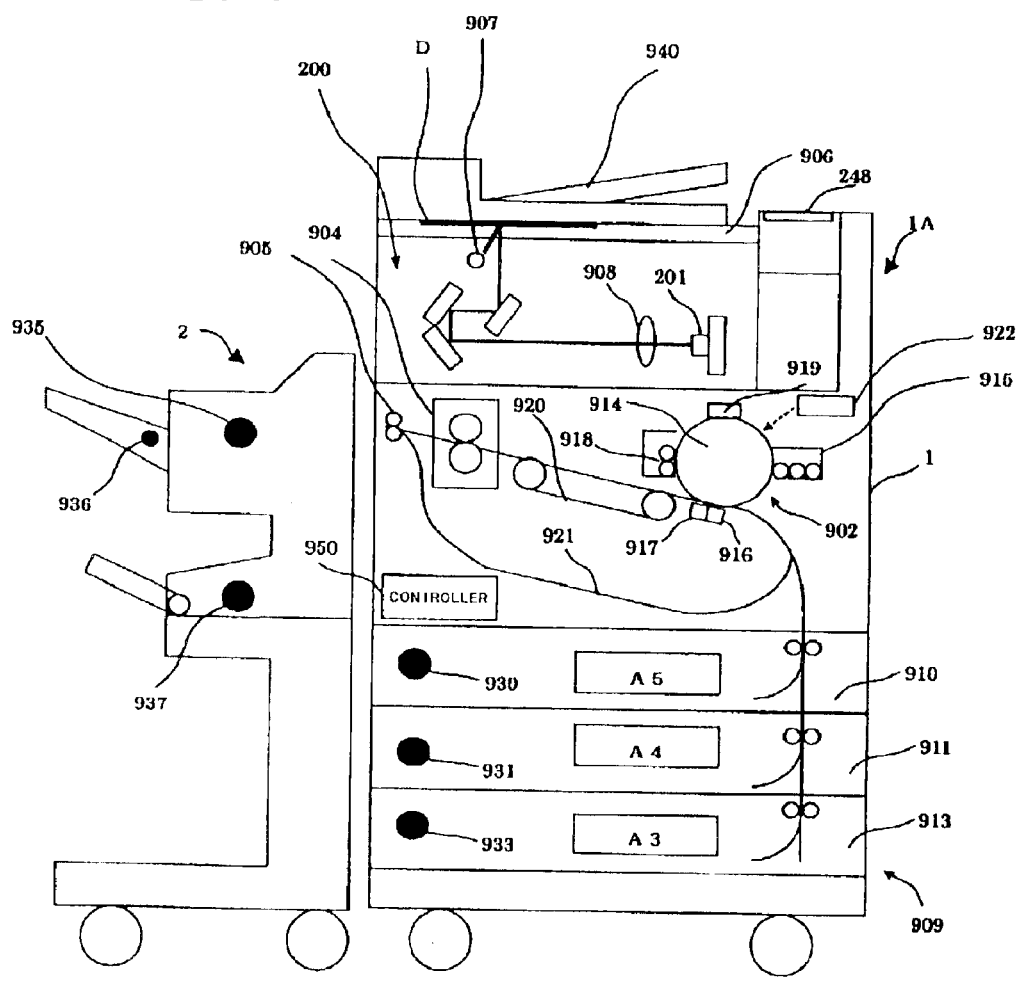
FIG. 1 is a side view of a digital copying apparatus according to the present invention.

As shown in FIG. 1, according to an embodiment of the present invention, a digital copying apparatus 1A includes a digital copying apparatus main unit 1 for forming an image on a sheet, and a sheet post-processing device 2 detachably mounted on the digital copying apparatus main unit 1 for performing a stitching operation and a folding operation on sheets discharged from the digital copying apparatus main unit 1.

The digital copying apparatus main unit 1 includes an image forming assembly 902 for recording an image of an original document D on the sheet; an image input unit 200 provided as a so-called scanner for focusing light reflected from the original document D on a CCD 201 through an optical system 908 and having a light source 907 disposed above the image forming assembly 902 for emitting light toward the original document D; a sheet feeder 909 arranged below the image forming assembly 902 for feeding the sheets to the image forming assembly 902 one by one; and a controller 950 for controlling these components.

The sheet feeder 909 is detachably mounted on the digital copying apparatus main unit 1, and includes a cassette 910 for holding A5 size sheets, cassette 911 for holding A4 size sheets, and cassette 913 for holding A3 size sheets. The cassettes 910, 911 and 913 are respectively provided with an A5 size sheet cassette selection switch 930 for manually selecting the A5 size sheets, an A4 size sheet cassette selection switch 931 for manually selecting the A4 size sheets, and an A3 size sheet cassette selection switch 933 for manually selecting the A3 size sheets. It is possible to manually select a sheet size by pressing one of the switches arranged on the respective cassettes while visually checking the sheet size. It is also possible to select a sheet size through a touch panel 248 as described later.

The image forming assembly 902 includes cylindrical photoconductive drum 914 for forming an electrostatic latent image on a circumference thereof. Arranged around the photoconductive drum 914 are a primary charging unit 919 for charging the photoconductive drum 914 for latent image formation; laser unit 922 for outputting a laser beam modulated in accordance with image data stored in a hard disk 961 (described later) to the photoconductive drum 914; a development unit 915 for developing the electrostatic latent image formed on the photoconductive drum 914 into a toner image; a transfer unit 916 for transferring the toner image onto the sheet; a separating charging unit 917 for charging the sheet in a polarity opposite to the transfer unit 916 to separate the sheet from the photoconductive drum 914; and a cleaner 918 for cleaning the photoconductive drum 914.

The laser unit 922 includes a semiconductor laser for generating a laser beam; a polygon mirror for converting the laser beam emitted from the semiconductor laser into a beam for a single scan line through a collimator lens; an fθ lens for collimating the laser beam for a scanning line from the polygon mirror; a mirror for guiding the collimated laser beam from the fθ lens to the photoconductive drum 914; and a motor for rotating the polygon mirror.

An endless conveyance belt 920 is wrapped and extended between rollers. One of the rollers is disposed at downstream of the photoconductive drum 914 and in the vicinity of the separating charging unit 917. The other of the rollers is disposed in the vicinity of a fixing unit 904 having a heater roller to heat and fix the toner image onto the sheet. A pair of discharge rollers 905 is arranged at downstream of the fixing unit 904 for discharging the sheet bearing an image thereon from the digital copying apparatus main unit 1. A duplexer 921 is arranged below the endless conveyance belt 920 between the discharge roller pair 905 and an upstream side of the photoconductive drum 914 for forming an image on the backside of the sheet with the image on the front side thereof for performing a both-side printing operation.

The digital copying apparatus main unit 1 also includes a platen glass 906 for receiving a document D thereon at an upper portion of the main unit, and a touch panel 248 for displaying a status of the digital copying apparatus 1A in accordance with information from a controller 950 and for receiving a command to the controller 950 from an operator. An automatic document feeder (ADF) 940 is arranged above the platen glass 906 for automatically feeding the document D to the platen glass 906. One side of the ADF 940 is fixed to an upper portion of the digital copying apparatus main unit 1, and the other side of the ADF 940 rotatably covers the platen glass 906.

Figure 2:
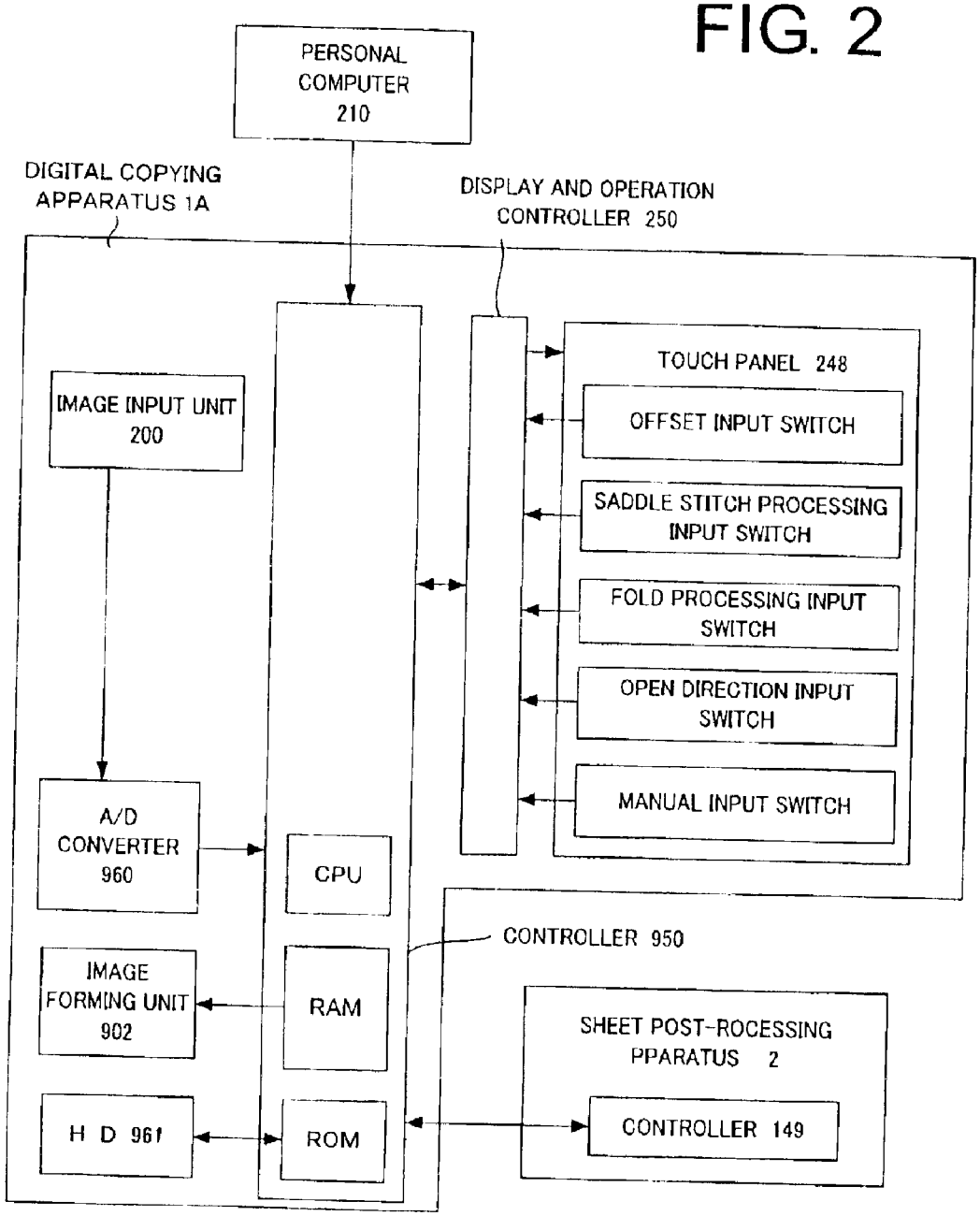
FIG. 2 is a block diagram illustrating a controller of a main unit of the digital copying apparatus.

As shown in FIG. 2, the controller 950 includes a central processing unit (CPU); a ROM storing a basic control program of the digital copying apparatus 1A; a RAM serving as a work area of the CPU; and an internal bus for connecting these components. An external bus is connected to the controller 950. The external bus through an interface (not shown) is connected to a personal computer 210; an A/D converter 960 for converting analog image data input through the image input unit 200 into digital data; a hard disk 961 for storing image data output from one of the image forming assembly 902, an image input unit 200, and the personal computer 210; a touch panel display operation controller 250 for controlling a display on the touch panel 248 and an operation command; and a controller 149 in the sheet post-processing device 2. The image input unit 200 is connected to the A/D converter 960, and the touch panel display operation controller 250 is connected to the touch panel 248.

The touch panel 248 functions as a sheet size selection switch for selecting a sheet size, a mode selection switch for selecting one of a non-stapling mode, side stapling mode, saddle stitching mode, etc. (described later), and a stack destination selection switch for selecting a destination of a booklet processed through the selected mode.

Figure 3:
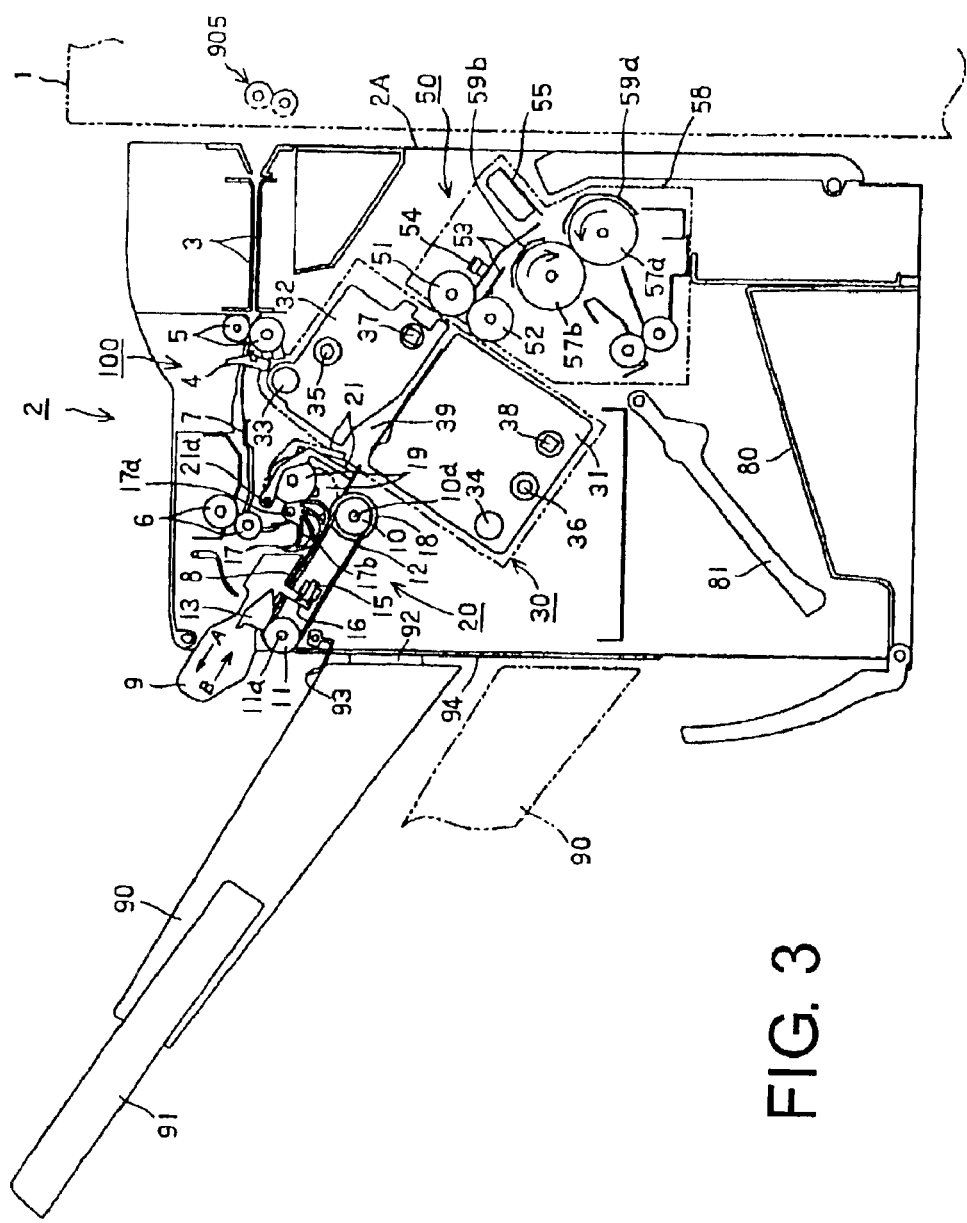
FIG. 3 is a side view of a sheet post-processing device.

As shown in FIG. 3, the sheet post-processing device 2 includes, in a device frame 2A as a casing of the sheet post-processing device 2, a conveyance unit 100 for conveying the sheet discharged from the digital copying apparatus main unit 1 in a substantially horizontal direction opposite to the discharge roller pair 905; an offset unit 20 arranged obliquely below the conveyance unit 100 for shifting an edge of the sheet; a stapler unit 30 arranged obliquely at downstream of the offset unit 20 for performing a stitching process on a sheet stack formed of a plurality of the sheets; a folding unit 50 arranged obliquely at downstream of the stapler unit 30 for performing a folding process on a folding position of the sheet stack as a predetermined position; a stack unit for collecting the sheets or booklet; and a controller for controlling these units in the sheet post-processing device 2.

The conveyance unit 100 includes a conveyance guide 3 for receiving the sheets successively discharged from the digital copying apparatus main unit 1 and guiding the sheets into the sheet post-processing device 2; a conveyance path guide 7 arranged at downstream of the conveyance guide 3 for guiding the sheets toward further downstream; a pair of conveyance rollers 5 arranged between the conveyance guide 3 and conveyance path guide 7 for nipping and conveying the sheets; a sheet detector sensor 4 arranged in the vicinity of a downstream position of the conveyance roller pair 5 for detecting the sheets brought into the conveyance path guide 7 and a jam of the sheets in the conveyance unit 100; and a pair of discharge rollers 6 arranged at the most downstream position in the conveyance path guide 7 for nipping and discharging the sheets.

As shown in FIG. 3, the offset unit 20 includes a process tray 8 for collecting the sheets discharged through the discharge roller pair 6. The process tray 8 is arranged obliquely with an angle of about 30 degrees relative to a placement surface of the digital copying apparatus main unit 1 downwardly in the sheet conveyance direction to assist the offset unit 20 to convey the sheet. Alignment plates 9 are disposed on the process tray 8 for guiding both sides of the sheets for alignment in a width direction.

Figure 4:
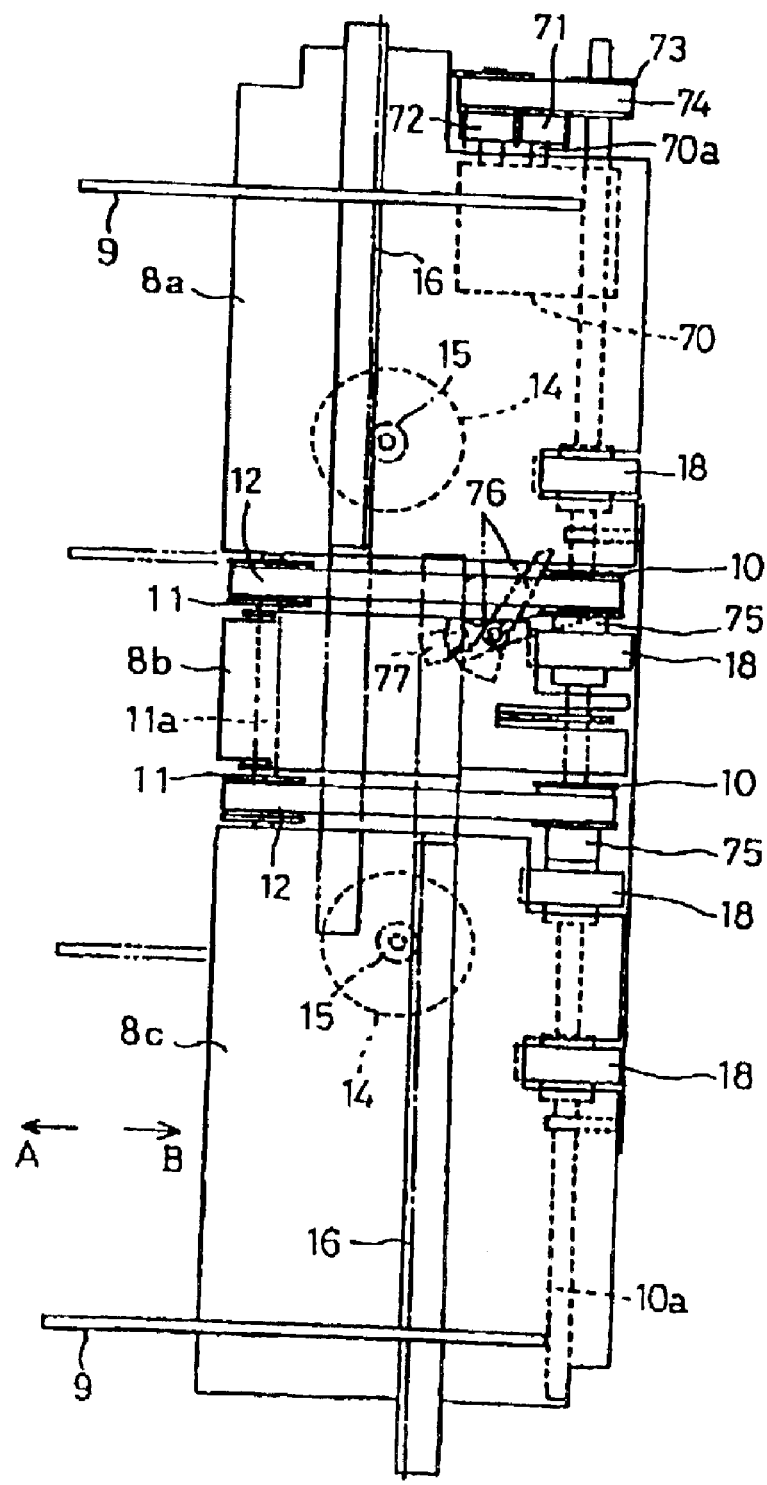
FIG. 4 is a plan view of a process tray of the sheet post-processing device.

As shown in FIG. 4, the process tray 8 has a rectangular shape elongated in a width direction substantially perpendicular to the sheet conveyance direction (i.e., a direction represented by an arrow B). The process tray 8 is divided into three portions, namely, a left tray 8c supporting a left portion (top portion in FIG. 4) of the sheet advancing in the sheet conveyance direction, a center tray 8b supporting a center portion of the sheet, and a right tray 8a supporting a right portion (bottom portion in FIG. 4).

Alignment motors 14 rotatable in forward and reverse directions are arranged on the left tray 8c and right tray 8a at lower portions thereof near the center tray 8b, respectively. Each of the alignment motors 14 has a pinion 15 fixed to a motor shaft thereof. The pinion 15 engages a rack 16 having a length substantially the same as that of the left tray 8c and right tray 8a in the width direction.

A fixing member having an elongated rectangular shape extends from a lower portion of each of the alignment plates 9. An end of the fixing member is fixed to the rack 16 through a slit extending in the width direction of the left tray 8c and right tray 8a (see also FIG. 3). The alignment plates 9 are thus movable in the width direction of the right tray 8a and left tray 8c as the alignment motors 14 rotate.

A stepping motor 70 rotatable in forward and reverse directions is arranged below the right tray 8a at one side thereof (a side of the stapler unit 30). The stepping motor 70 has a gear 71 fixed to a motor shaft 70a thereof. The gear 71 engages a gear portion of a gear pulley 72 pivotally supported on a fixed arm extending from the stepping motor 70. A timing belt 74 is placed between a pulley portion of the gear pulley 72 and a pulley 73. The pulley 73 is fixed to a first pulley shaft 10a rotatably supported below the process tray 8 at one side thereof and having a length substantially the same as the width of the process tray 8. A second pulley shaft 11a having a length shorter than that of the first pulley shaft 10a is rotatably supported below the center tray 8b at a position opposite to the first pulley shaft 10a (the other side of the center tray 8b).

The first pulley shaft 10a has four conveyance lower rollers 18 rigidly attached thereto, i.e., two rollers on a right side and the two other rollers on a left side of the sheet advancing in the sheet conveyance direction (i.e. an upper side and a lower side in FIG. 4). The conveyance lower rollers 18 have a hollow shape like a tire. A circumference of each conveyance lower roller 18 is exposed above a top surface of the process tray 8 through a cutout formed in one side of the process tray 8 (see also FIG. 5).

The first pulley shaft 10a is attached to first pulleys 10 having a diameter smaller than the conveyance lower rollers 18 through one-way clutches 75 transferring only counterclockwise rotation to the first pulleys 10. Second pulleys 11 are attached to both ends of the second pulley shaft 11a and have a diameter the same as that of the first pulley 10. The first pulley 10 and second pulley 11 are arranged between the center tray 8b and the right tray 8a, and between the center tray 8b and the left tray 8c.

Two endless conveyance belts 12 are place between the first pulleys 10 and second pulleys 11. Accordingly, the rotation of the stepping motor 70 transferred to the first pulley shaft 10a through the on-way clutch 75 is transferred to the second pulley 11 only when the first pulleys 10 rotate counterclockwise, in other words, only when the conveyance belts 12 move in the arrow direction A in FIG. 4. When the first pulley shaft 10a rotates clockwise (when the conveyance belts 12 convey in an arrow direction B in FIG. 4), the rotation is not transferred to the second pulleys 11.

As shown in FIG. 3, a paddle 17 is disposed below the conveyance path guide 7 and above the process tray 8. The paddle 17 rotates around an axis 17a for urging the sheet in the sheet conveyance direction. The paddle 17 is formed of an elastic material such as rubber having a certain elasticity, and includes integrally formed fins 17b radially extending from the axis 17a as the center thereof. As the sheets are discharged or collected into the process tray 8, the paddle 17 deforms elastically, thereby providing an appropriate urging force to the sheets in the sheet conveyance direction.

Figure 5:
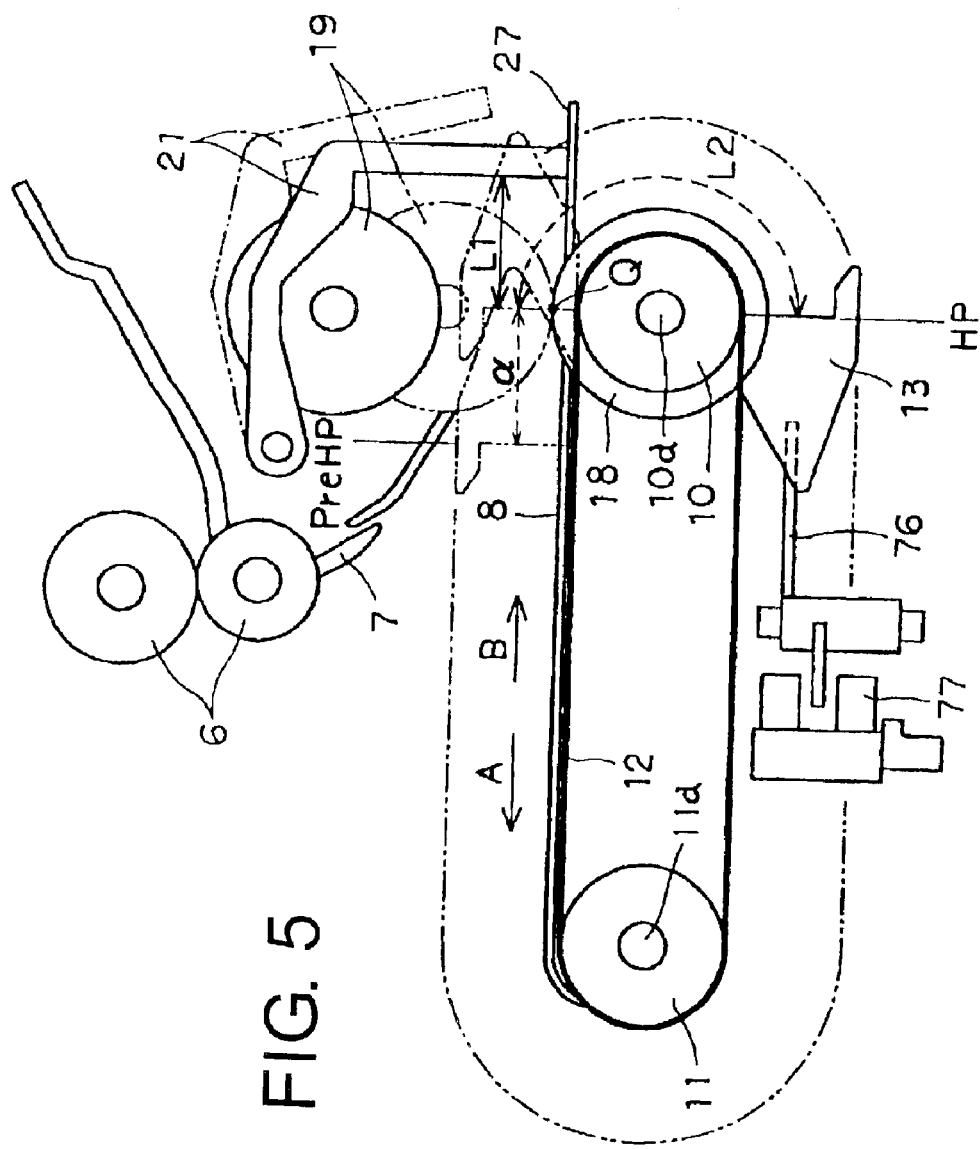
FIG. 5 is a side view around a conveyance belt of the process tray of the sheet post-processing device.

As shown in FIG. 5, a pushing claw 13 is attached to the conveyance belt 12 for abutting an edge of the sheet stack composed of a plurality of the sheets on the process tray 8 and pushing the sheet stack in the arrow direction A. The pushing claw 13 has a home position (also referred to as HP position), where an edge of the pushing claw 13 is located right below the first pulley shaft 10a. A detector arm 76 engaging the pushing claw 13 and an arm detector sensor 77 formed of an emitter-receptor integrated type are arranged below the conveyance belt 12 for detecting the HP position of the pushing claw 13 (also see FIG. 4).

A conveyance upper roller 19 is arranged above each of the conveyance lower rollers 18. The conveyance upper roller 19 moves between a contact position (a first position) where the conveyance upper roller 19 contacts the conveyance lower roller 18 at a contact point (nip) Q as represented by a phantom line in FIG. 5 and a spaced position (a second position) where the conveyance upper roller 19 is away from the conveyance lower roller 18. The conveyance upper roller 19 moves between the contact position and the spaced position through a cam (not shown), etc., and the conveyance upper roller 19 rotates with the stepping motor 70 (see FIG. 12) through a gear (not shown).

A first stack guide 27 having a plate shape is arranged on a tilted plane the same as that of the process tray 8 at downstream of the process tray 8 for supporting (hold) the sheet stack in cooperation with the process tray 8. A stopper 21 is arranged above the first stack guide 27 for restraining and aligning edges of the sheets. The sheets are urged downwardly in the sheet conveyance direction by their own weight on the tilted process tray 8 and first stack guide 27, and are further urged by the rotation of the paddle 17.

Figure 6:
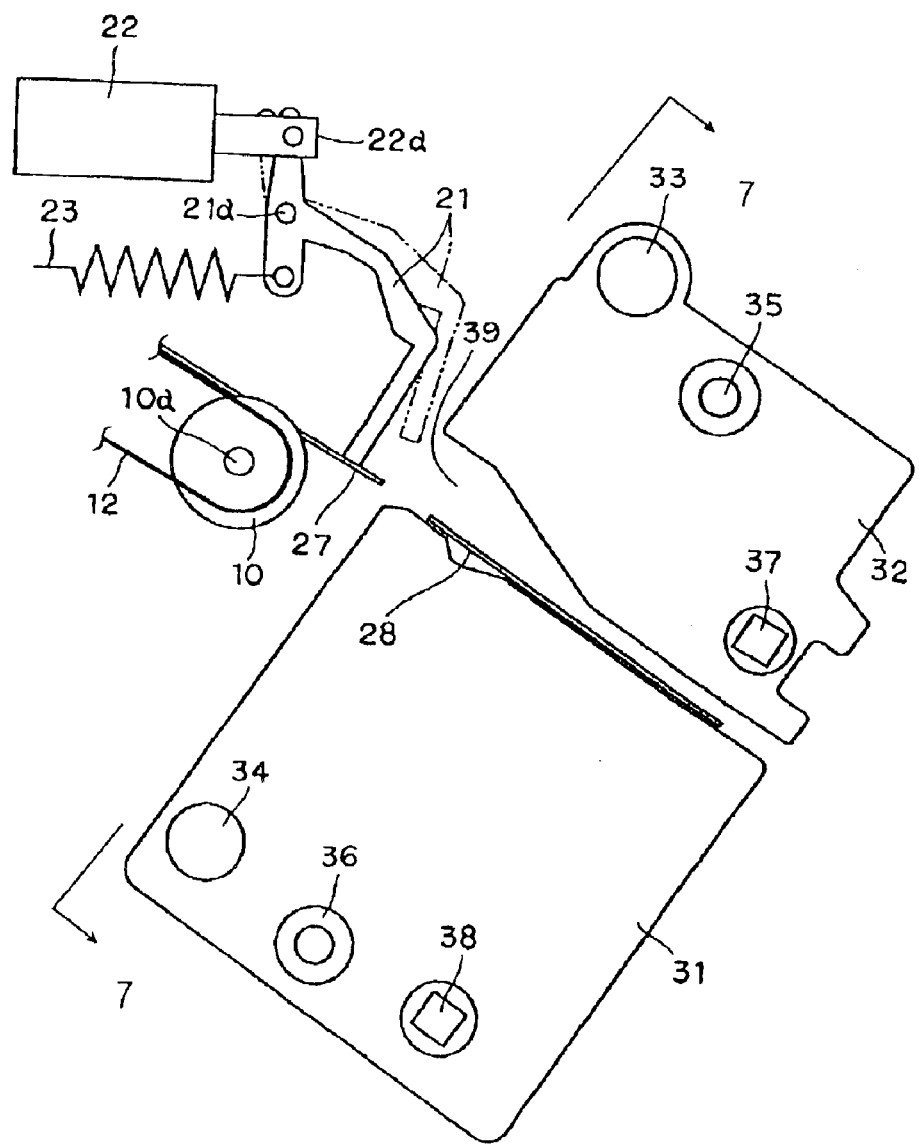
FIG. 6 is a side view around a stopper of the sheet post-processing device.

As shown in FIG. 6, the stopper 21 has a J-shaped cross section with an arm and a leg. One end of the arm is connected to a plunger 22a of a solenoid 22, and the other end of the arm is pulled by a spring 23 with a predetermined tension. Accordingly, in response to an on/off operation of the solenoid 22, the stopper 21 pivotally moves around a support shaft 21a located at the approximate center of the arm thereof between a restraining position represented by a solid line where a bottom surface of the leg (an end of the leg) abuts against a top surface of the first stack guide 27 and a retraction position represented by a phantom line where the stopper 21 is retracted from the top surface of the first stack guide 27. The stopper 21 normally stays at the retraction position (with the solenoid 22 remaining in the off state) represented by the solid line.

The pushing claw 13 can move in a direction represented by an arrow A in FIG. 5 in a normal state (with the conveyance upper roller 19 at the spaced position and the stopper 21 at the retraction position). L1 represents a distance between the end face of the pushing claw 13 and the stopper 21 when the end face of the pushing claw 13 is positioned at the contact point Q between the conveyance lower roller 18 and the conveyance upper roller 19. L2 represents a distance from the end face of the pushing claw 13 at the HP position to the contact point Q. In this case, it is arranged that L1 is smaller than L2.

As shown in FIG. 5, the lower end portion of the conveyance path guide 7 extending below the discharge roller pair 6 engages a fixed guide pressing the sheet discharged into the process tray 8 to prevent the edge of the sheet from being lifted above the conveyance upper roller 19.

As shown in FIGS. 3 and 6, the stapler unit 30 is arranged at downstream of the offset unit 20. The stapler unit 30 includes a head assembly 31 and anvil assembly 32. The head assembly 31 has a staple cartridge disposed below a conveyance path 39 for conveying the stack of the sheets to drive a staple. The anvil assembly 32 is disposed above the head assembly 39 for receiving tips of the staple driven from the head assembly 31 to fold the staple. A second stack guide 28 is arranged in the conveyance path 39 above the head assembly 31 at a position away from an insertion head of the head assembly 31 that drives the staple, and has a tilted plane the same as that of the first stack guide 27. The stapler unit 30 is formed in a unit as represented by a phantom line in FIG. 3, and can be drawn toward front in FIGS. 3 and 6 for replenishing staples.

Figure 7:
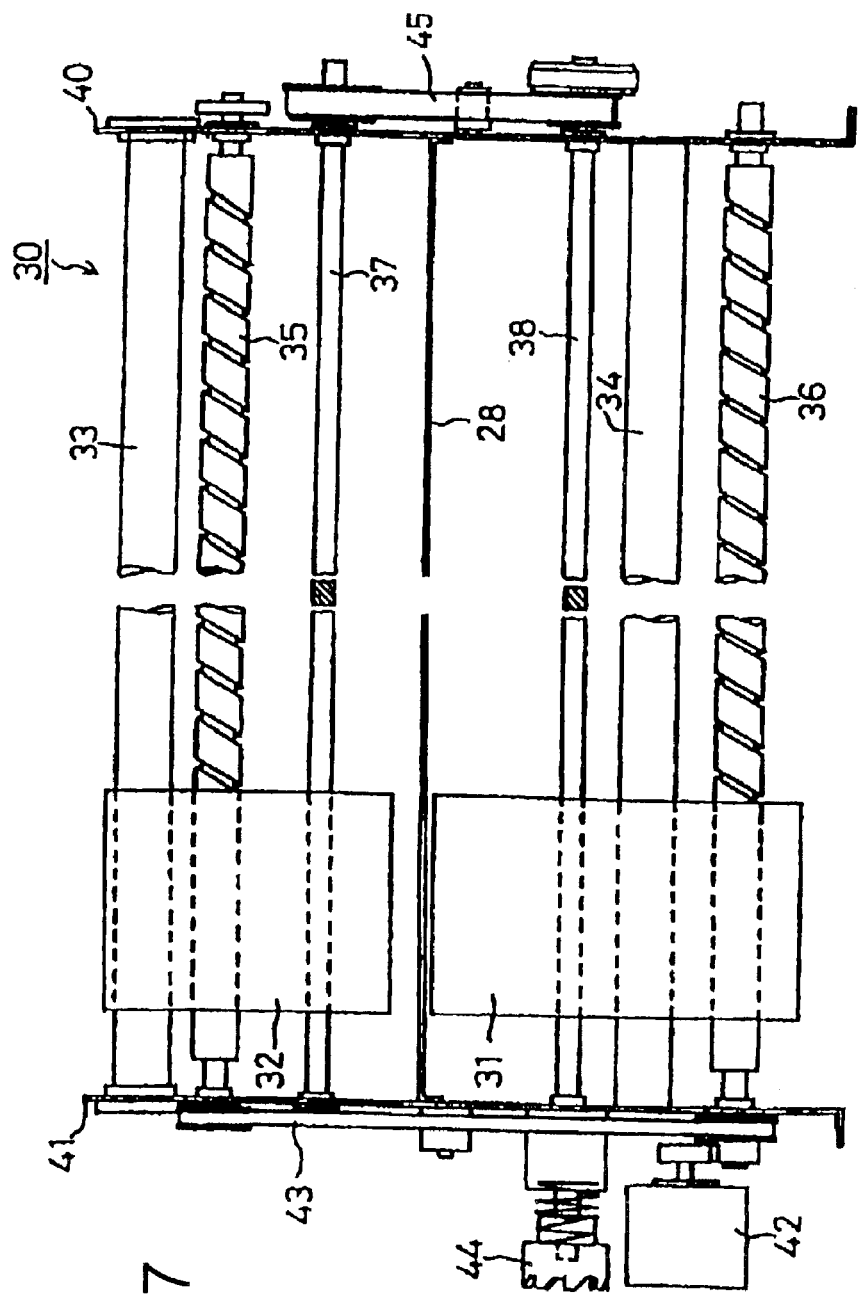
FIG. 7 is a front view of a stapler unit of the sheet post-processing device viewed from line 7—7 in FIG. 6.

As shown in FIG. 7, the stapler unit 30 includes guide rods 33, 34 between left and right unit frames 40, 41 for supporting and guiding the head assembly 31 and anvil assembly 32 in a direction perpendicular to the sheet conveyance direction; guide screw shafts 35, 36 having helical screws therein for sliding the head assembly 31 and anvil assembly 32 in he direction perpendicular to the sheet conveyance direction; and an anvil driving shaft 37 and head driving shaft 38 having a rectangular cross section for allowing the head assembly 31 and anvil assembly 32 to perform a staple driving operation and staple folding operation, respectively.

The head assembly 31 and anvil assembly 32 engage the guide screw shafts 36, 35. When the guide screw shafts 36, 35 rotate, the head assembly 31 and anvil assembly 32 move leftward or rightward in FIG. 7. A stapler slide motor 42 is arranged at the outside of the unit frame 41 for rotating the guide screw shaft 36 in a forward or reverse direction through gears. At the same time, the rotation of the stapler slide motor 42 is transferred to the anvil assembly 32 through a timing belt 43 placed around pulleys fixed to the guide screw shafts 36, 35 at the outside of the unit frame 41.

A stapling/folding stepping motor 170 (see FIG. 12) transfers the rotation thereof to the head driving shaft 38 through a coupling device 44 arranged at the outside of the unit frame 41. The rotation of the stapling/folding motor 170 is also transferred to the anvil assembly 32 through a timing belt 45 placed around pulleys fixed to the head driving shaft 38 and anvil driving shaft 37 at the outside of the unit frame 40. In this arrangement, the head assembly 31 and anvil assembly 32 move in synchronization with each other in the direction perpendicular to the sheet conveyance direction while maintaining a vertical alignment therebetween. The stapler slide motor 42 is controlled to move the head assembly 31 and anvil assembly 32 to drive the staple into the sheets at an appropriate position in accordance with the width of the sheets.

As shown in FIG. 3, the folding unit 50 is formed in a unit represented by a phantom line and arranged at downstream of the stapler unit 30. Similar to the stapler unit 30, the folding unit 50 is detachable from the sheet post-processing device 2.

A general construction of the folding unit 50 is first described. A stack conveyance upper roller 51 and stack conveyance lower roller 52 are arranged at an entrance of the folding unit 50 for nipping and conveying the sheet stack in a downstream direction. A stack conveyance guide 53 is arranged at downstream of the stack conveyance upper roller 51 and stack conveyance lower roller 52 for guiding the sheet stack fed from the roller pair further in a downstream direction. An edge detector sensor 54 formed of an emitter-receptor integrated type sensor is arranged in the sheet stack conveyance path of the stack conveyance guide 53 for detecting a forward edge of the sheet stack. According to a signal of detecting the forward edge of the sheet stack, a controller (described later) allows the stack conveyance upper roller 51 to press against the stack conveyance lower roller 52, and controls to set a folding position of the sheet stack in the sheet conveyance direction.

Figure 9:
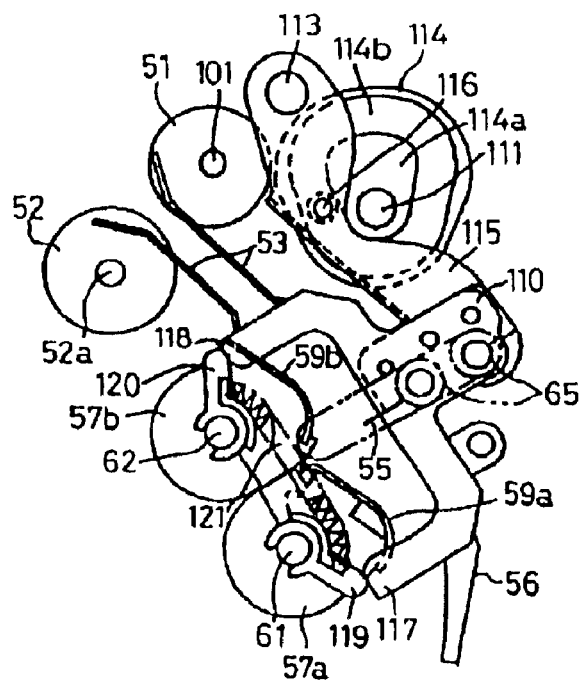
FIG. 9(A) is a side view of a folding mechanism of the folding unit.
FIG. 9(B) is a side view of the folding mechanism in a folding operation of the folding mechanism.
Figure 9:
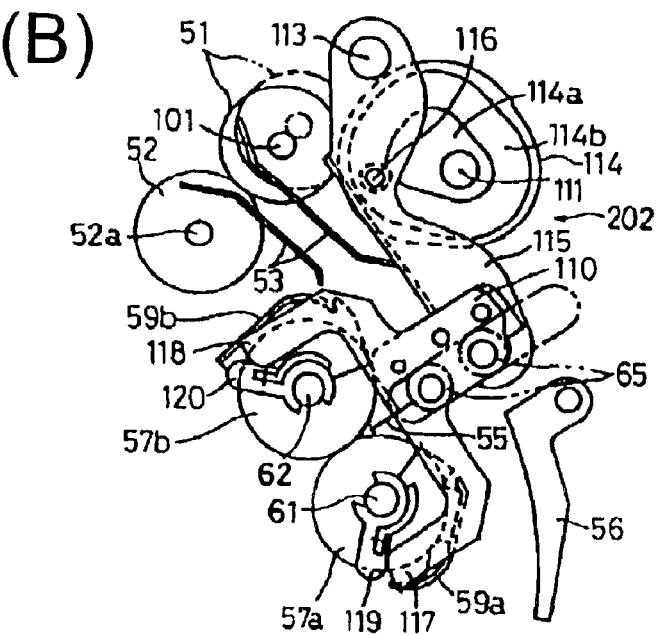

The stack conveyance upper roller 51 moves between a position represented by a solid line where the stack conveyance upper roller 51 is pressed against the stack conveyance lower roller 52 and a spaced position where the stack conveyance upper roller 51 is away from the stack conveyance lower roller 52 (as represented by a projected line in FIG. 9(B)). The stack conveyance upper roller 51 remains at the spaced position away from the stack conveyance lower roller 52 until the edge detector sensor 54 detects the forward edge of the sheet stack. The rollers 51 and 52 are pressed against with each other when the edge detector sensor 54 detects the forward edge of the sheet stack.

A pair of rollers 57a and 57b is arranged below the stack conveyance guide 53, and is respectively driven and pressed against each other in a direction perpendicular to the sheet stack conveyance direction for folding the sheet stack. Each of the rollers 57a and 57b has a diameter so that each roller rotates at least one revolution during the folding of the sheet stack (a diameter of 40 mm, for example).

A pushing plate 55 is arranged at downstream of the stack conveyance guide 53 in a direction perpendicular to the sheet stack conveyance direction. An edge of the pushing plate 55 moves close to the contact position of the folding rollers 57a, 57b to push the sheet stack into the contact position between the folding rollers 57a, 57b. The pushing plate 55 is made of stainless steel, and has a thickness of 0.25 mm at the end thereof.

Backup guides 59a and 59b having semicircular shapes in cross section are arranged above the folding rollers 57a and 57b for assisting the stack conveyance guide 53 to guide the sheet stack. As will be described later, the backup guides 59a and 59b move when the pushing plate 55 moves up and down in a direction perpendicular to the sheet stack conveyance direction. When the edge of the pushing plate 55 moves close to the nip between the folding rollers 57a and 75b, the backup guides 59a and 59b move and open circumferences thereof relative to the sheet stack.

Figure 8:
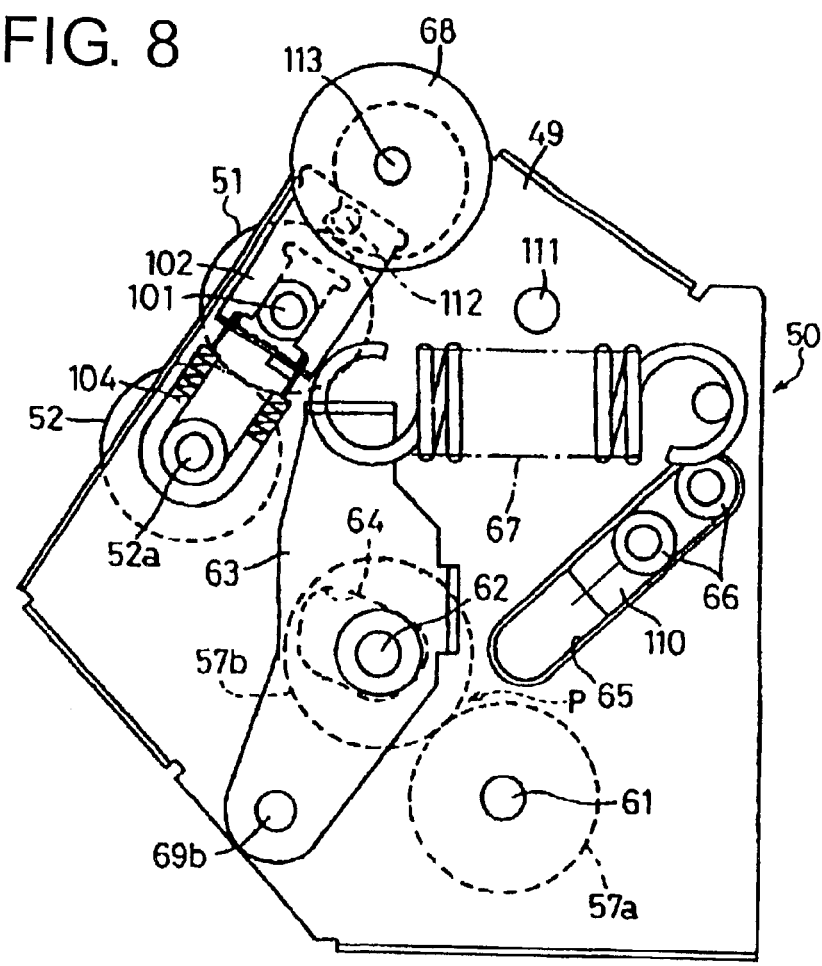
FIG. 8 is a side view illustrating a folding unit of the sheet post-processing device.

The folding unit 50 is described below in detail. As shown in FIG. 8, the folding rollers 57a and 57b are fixed to folding roller driving shafts 61 and 62 pivotally and rotatably supported on a unit frame 49. A bow-shaped (boomerang-like shape) roller holder 63 is attached to the folding roller driving shaft 62 so that the folding roller driving shaft 62 passes through the center of the folding roller holder 63. The folding roller holder 63 has one end rotatably supported on a fixed shaft 69b fixed to the unit frame 49, and the other end pulled by a pulling spring 67 fixed to the unit frame 49 with a pulling force of about 49 N (5 kgf).

The unit frame 49 has a guide hole 64 for allowing the folding roller driving shaft 62 to move therein when the folding roller holder 63 rotates. Therefore, when the folding rollers 57a and 57b fold the sheet stack, the pulling spring 67 applies a constant pressure on the sheet stack to assure the folding operation.

The pushing plate 55 projects from a roll 66 movably retained in a support holder 110. The unit frame 49 has a pushing plate guide slot 65 for guiding the roll 66 in the support holder 110. The pushing plate 55 moves toward the nip P of the folding rollers 57a and 57b while being guided by the pushing plate guide slot 65.

An upper roller shaft 101 of the stack conveyance upper roller 51 and lower roller shaft 52a of the stack conveyance lower roller 52 are supported on the unit frame 49 for conveying the sheet stack to the folding unit 50. The stack conveyance upper roller 51 and stack conveyance lower roller 52 need to be spaced from each other until the sheet stack is brought into the folding unit 50. For this reason, it is arranged that the stack conveyance upper roller 51 is situated at a position away from the stack conveyance lower roller 52 with the following mechanism.

Specifically, the upper roller shaft 101 is supported on a bearing holder 102. A cam follower 112 projects from a top end portion of the bearing holder 102. The cam follower 112 engages an upper roller movement cam 68 rotatably supported on the unit frame 49. A pulling spring 104 having a pulling force of approximately 2.9 N (about 300 gf) extends between the lower ends of the bearing holder 102 and the lower roller shaft 52a to press the stack conveyance upper roller 51 against the stack conveyance lower roller 52. The bearing holder 102 is lifted against the pulling spring 104 when the upper roller movement cam 68 rotates. Accordingly, the stack conveyance upper roller 51 moves between the position spaced apart from the stack conveyance lower roller 52 and the contact position.

As shown in FIGS. 9(A) and 9(B), the folding unit 50 includes a cam plate 114 having a cam 114a for moving the pushing plate 55. The cam plate 114 is fixed to a cam driving shaft 111 pivotally supported on the unit frame 49. A cam timing of the cam plate 114 is set so that the pushing plate 55 moves about twice as fast as the folding rollers 57a and 57b, and so that the pushing plate 55 does not contact both edges of the sheet stack even if the pushing plate 55 pushes twice or more.

It is arranged that the movement speed of the pushing plate 55 is predetermined times fast as the conveyance speed of the folding rollers 57a and 57b. Therefore, a period of time for the stitched position of the sheet stack conveyed by the folding rollers 57a and 57b to reach the nip P becomes substantially equal to a period of time for the pushing plate 55 to reach the nip of the folding rollers 57a and 57b after the pushing plate 55 contacts the stitching position of the sheet stack. Thus, the folding rollers 57a and 57b and pushing plate 55 move in synchronization.

It is also arranged that the timing of the movement of the pushing plate 55 after a double pushing is mechanically set so that the pushing plate 55 does not contact both edges of the folded sheet stack having a predetermined size. The movement timing of the pushing plate 55 is set in this way, and the folding timing of the folding rollers 57a and 57b is also set with the roller diameter thereof as a predetermined value. Specifically, the folding operation is performed at the two timings when the sheet stack is folded. Accordingly, regardless of the size of the sheet, it is possible to prevent the pushing plate 55 from touching both edges of the sheet.

An actuator arm 115 having a bow shape in cross section is pivotally supported at one end thereof on a shaft 113 of the upper roller movement cam 68. The support holder 110 is fixed to the other end of the actuator arm 115 as a pivoting end. The cam plate 114 has a cam groove 114b. A cam follower 116 projecting from an approximate center of the actuator arm 115 is inserted in the cam groove 114b. When the cam plate 114 rotates, the cam 114a presses the cam follower 116 to lift the actuator arm 115. The pushing plate 55 fixed to the actuator arm 115 is thus movable between a position for pushing the sheet stack and a standby position.

Levers 119 and 120 are rotatably supported on the folding roller driving shafts 61 and 62 of the folding rollers 57a and 57b, respectively. Backup guides 59a and 59b are attached to the levers 119 and 120 for covering the circumferences of the folding rollers 57a and 57b, and are rotatably supported on the folding roller driving shafts 61 and 62 with respect to the circumferences of the folding rollers 57a and 57b. The backup guides 59a and 59b are pulled to each other by a spring 121. Ends of the levers 119 and 120 engage and are supported on end portions 117 and 118 branched from the support holder 110.

A guide 56 is disposed below the support holder 110 for shifting the stack conveyance direction of the sheet stack nipped between and conveyed by the stack conveyance upper roller 51 and stack conveyance lower roller 52 to a downward direction. The guide 56 guides the sheet stack so that the forward edge of the sheet stack is suspended downward in a sheet stack passage 58 (see FIG. 3) formed between a device frame 2A and the folding unit 50.

As shown in FIG. 9(A), when the stack conveyance upper roller 51 is away from the stack conveyance lower roller 52, the backup guides 59a and 59b are positioned to cover the circumferences of the folding rollers 57a and 57b at a side of the conveyance passage. Thus, the backup guides 59a and 59b function as an extension from the lower stack conveyance guide 53, thereby assisting the stack conveyance guide 53 to convey the sheet.

As shown in FIG. 9(B), when the operation of folding the sheet stack is performed, the support holder 110 is lowered toward the nip P between the folding rollers 57a and 57b. The levers 119 and 120 are lowered by the end portions 117 and 118, and the backup guides 59a and 59b rotate around the folding roller driving shafts 61 and 62 against the spring 121, thereby allowing the circumferences of the folding rollers 57a and 57b to contact the sheet stack.

The drive transfer system of the folding unit 50 is divided into a stack conveyance roller driving subsystem for driving (rotating and moving away) the stack conveyance upper roller 51 and stack conveyance lower roller 52, and a folding roller/pushing plate driving subsystem for rotating the folding rollers 57a and 57b while moving the pushing plate 55. These subsystems are arranged at a deep side of the unit frame 49 as shown in FIG. 8.

Figure 10:
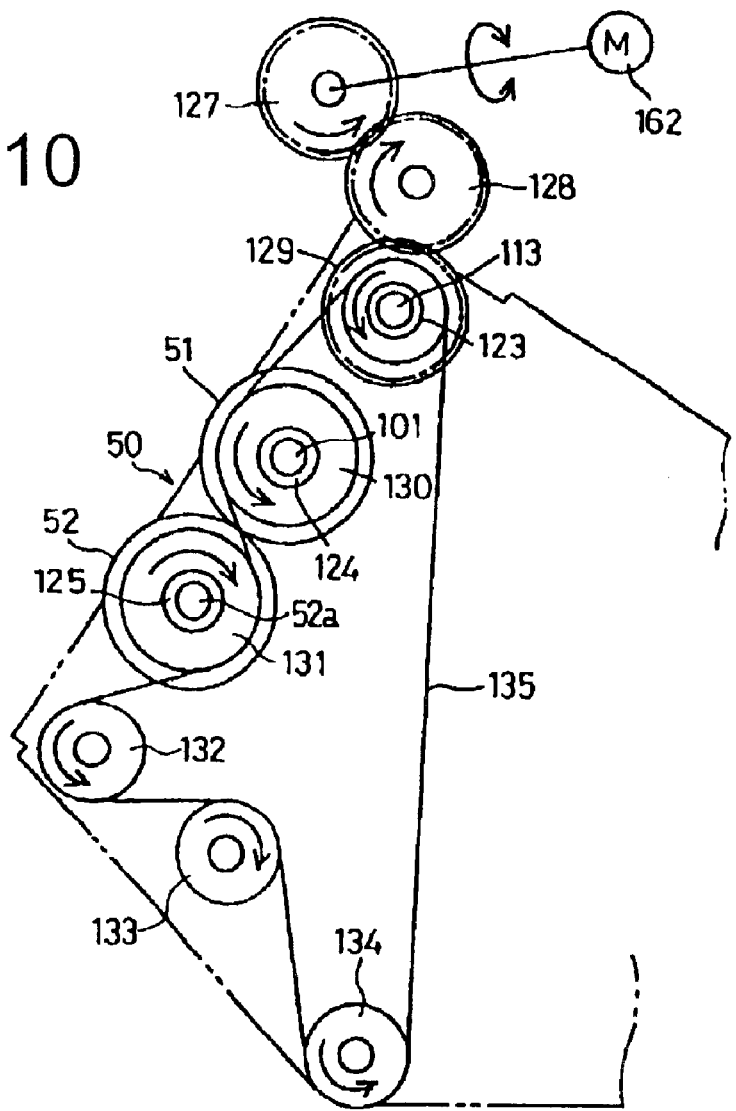
FIG. 10 is a side view of a driving system of a conveyance roller of the folding unit.

As shown in FIG. 10, a conveyance motor 162 formed of a stepping motor capable of rotating in forward and reverse directions drives the stack conveyance roller driving subsystem. The rotation of the conveyance motor 162 is transferred to a gear pulley 129 through gears 127 and 128. A one-way clutch 123 is interposed between the gear pulley 129 and the shaft 113 driving the upper roller movement cam 68. Accordingly, with the one-way clutch 123, the upper roller movement cam 68 rotates to move the stack conveyance upper roller 51 vertically only when the gears 127 and 128 rotate in directions opposite to the arrow directions in FIG. 10.

The rotation of the gear pulley 129 is transferred to the upper roller shaft 101 and lower roller shaft 52a through a timing belt 135 placed around pulleys 130 and 131. A one-way clutch 124 is interposed between the pulley 130 and the upper roller shaft 101, and a one-way clutch 125 is interposed between the pulley 131 and the lower roller shaft 52a. Accordingly, the upper roller shaft 101 and lower roller shaft 52a rotate only when the pulleys 130 and 131 rotate in the arrow directions in FIG. 10. The timing belt 135 is also placed around pulleys 132, 133, and 134.

When the gears 127 and 128 rotate in the arrow directions in FIG. 10, the stack conveyance upper roller 51 and stack conveyance lower roller 52 rotate in directions to convey the sheet stack into the folding unit 50. When the gears 127 and 128 rotate in the directions opposite to the arrow directions in FIG. 10, the upper roller movement cam 68 rotates, thereby spacing the stack conveyance upper roller 51 away from the stack conveyance lower roller 52. A controller 149 (described later) controls these operations when sensors detect flag pegs (not shown) fixed to a shaft 132 of a pulley 133.

Figure 11:
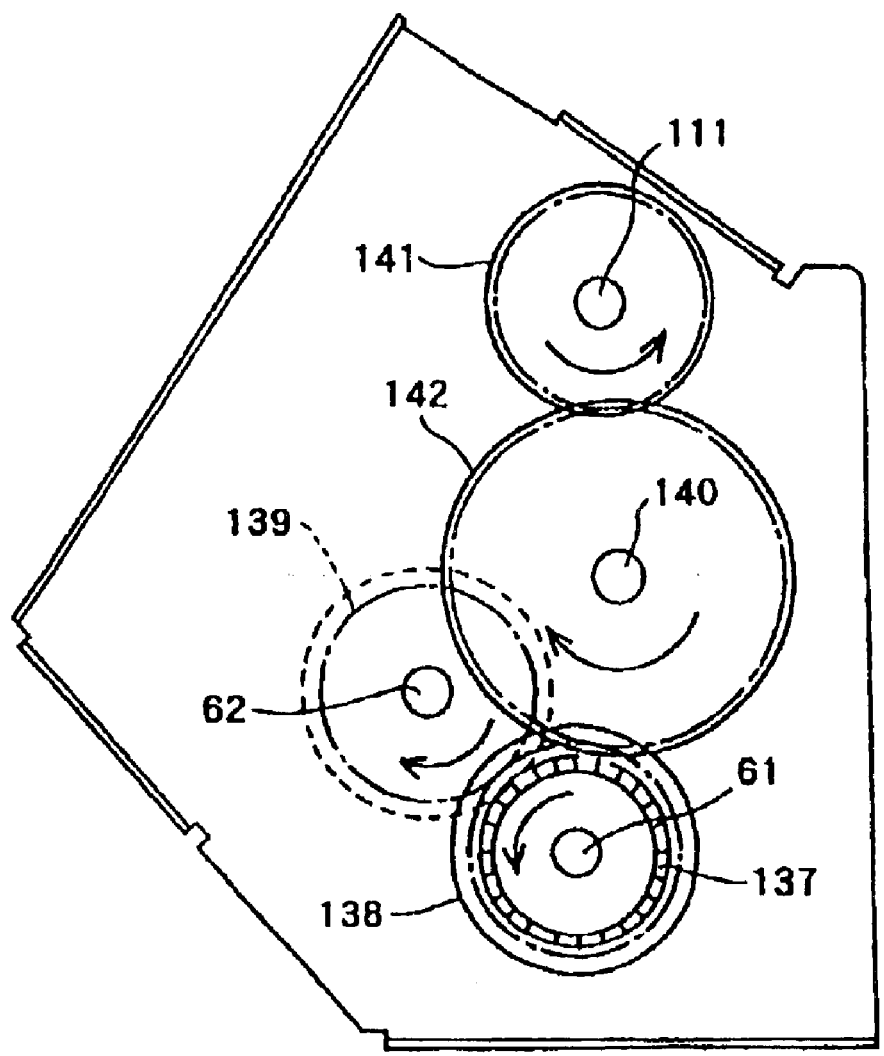
FIG. 11 is a side view of a driving system of a folding roller and pushing plate in the folding unit.

As shown in FIG. 11, the stapling/folding motor 170 drives the folding roller/pushing plate driving subsystem (see FIG. 12) through a coupling device 137 attached to the folding roller driving shaft 61. The stapling/folding motor 170 drives the coupling device 44 of the stapler unit 30 shown in FIG. 8 with the forward rotation, or drives the coupling device 137 with the reverse rotation through a driving and transfer system (not shown).

The rotation of the coupling device 137 is transferred to a gear 139 rigidly fixed to the folding roller driving shaft 62 through the gear 138 rigidly fixed to the folding roller driving shaft 61. Furthermore, the rotation of the gear 138 is transferred to the cam driving shaft 111 of the cam plate 114 through a gear 142 rotatable around a shaft 140 and a gear 141 engaging the gear 142. The cam plate 114 activates the actuator arm 115 to move the pushing plate 55. The controller (described later) determines a position of the cam plate 114 when a flag peg (not shown) attached to the cam driving shaft 111 is detected by a sensor.

As shown in FIG. 3, a folded sheet stack discharge stacker 80 is arranged at downstream of the folding unit 50 at a bottom portion of the sheet post-processing device 2. The folded sheet stack discharge stacker 80 has a tilted plane opposite to those of the offset unit 20, stapler unit 30, and stapler unit 30, and stocks the sheet stack folded by the folding unit 50. A folded sheet pressure member 81 having one end pivotally supported is arranged above the folded sheet stack discharge stacker 80. The folded sheet pressure member 81 presses the discharged sheet stack using an urging force of a spring or the like in cooperation with the force of gravity of the sheet stack working along the tilted plane of the folded sheet stack discharge stacker 80.

A lifting tray 90 is arranged on a sidewall of the device frame 2A opposite to the digital copying apparatus main unit 1. The lifting tray 90 moves in a vertical direction with respect to the device frame 2A. A lifting tray support 92 supports the lifting tray 90. A lifting tray motor 155 formed of a stepping motor capable of rotating in a forward and reverse directions (see FIG. 12) moves the lifting tray support 92 vertically through a belt (not shown). The lifting tray 90 is raised and lowered between an upper limit position represented by a solid line and a lower limit position represented by a phantom line in FIG. 3.

The lifting tray 90 includes an auxiliary tray 91, and the auxiliary tray 91 is pulled out from the lifting tray 90 to place a large-size sheet thereon. A sheet surface sensor 93 is arranged below the second pulley 11 of the offset unit 20 for detecting a top surface of the sheets on the lifting tray 90. A rear edge guide 94 is arranged on the sidewall of the lifting tray 90 of the device frame 2A for guiding the rear edge of the sheet on the lifting tray 90 when the lifting tray 90 is raised or lowered.

Figure 12:
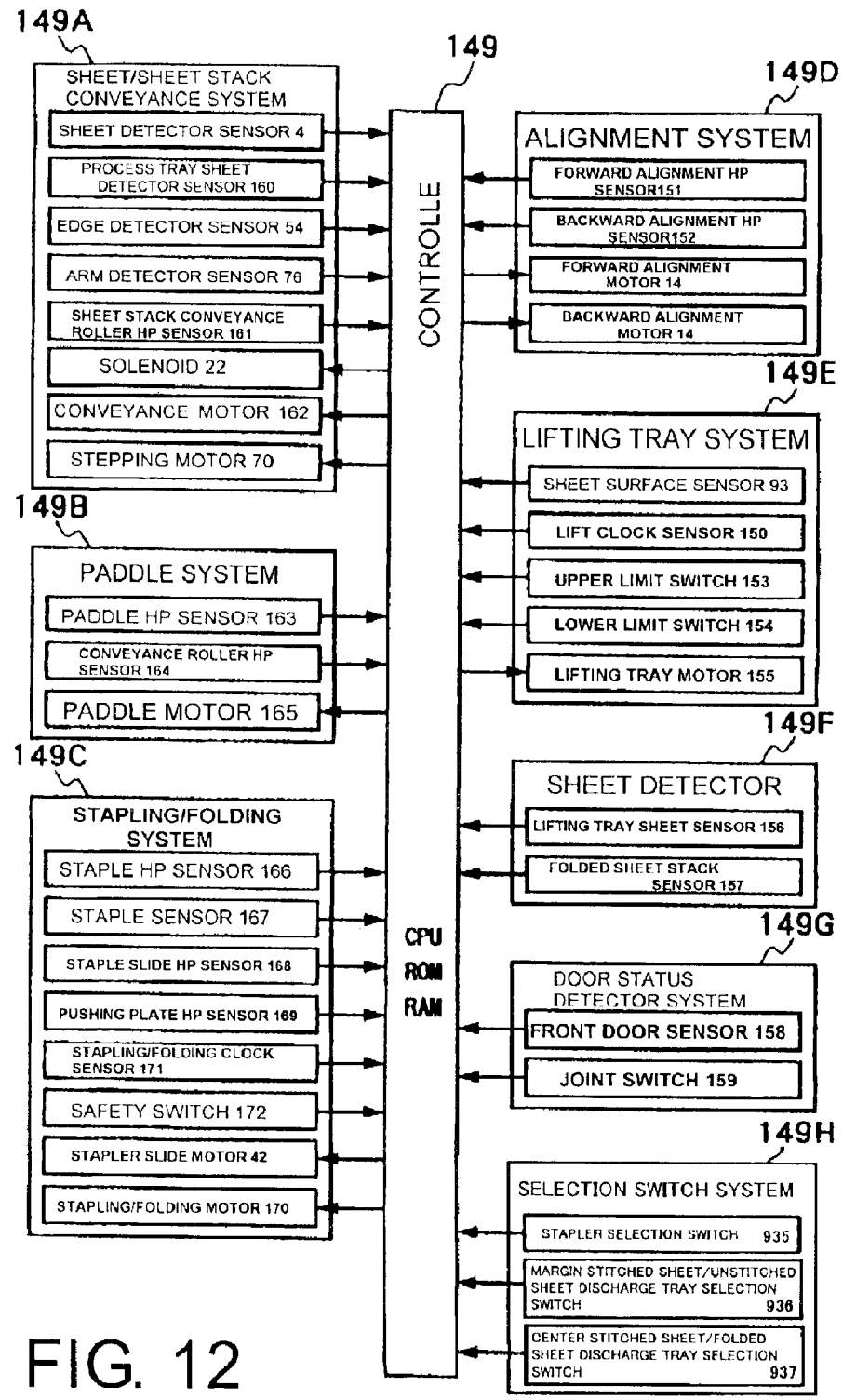
FIG. 12 is a block diagram illustrating a relationship among a controller, sensors and actuators of the sheet post-processing device.
Figure 13:
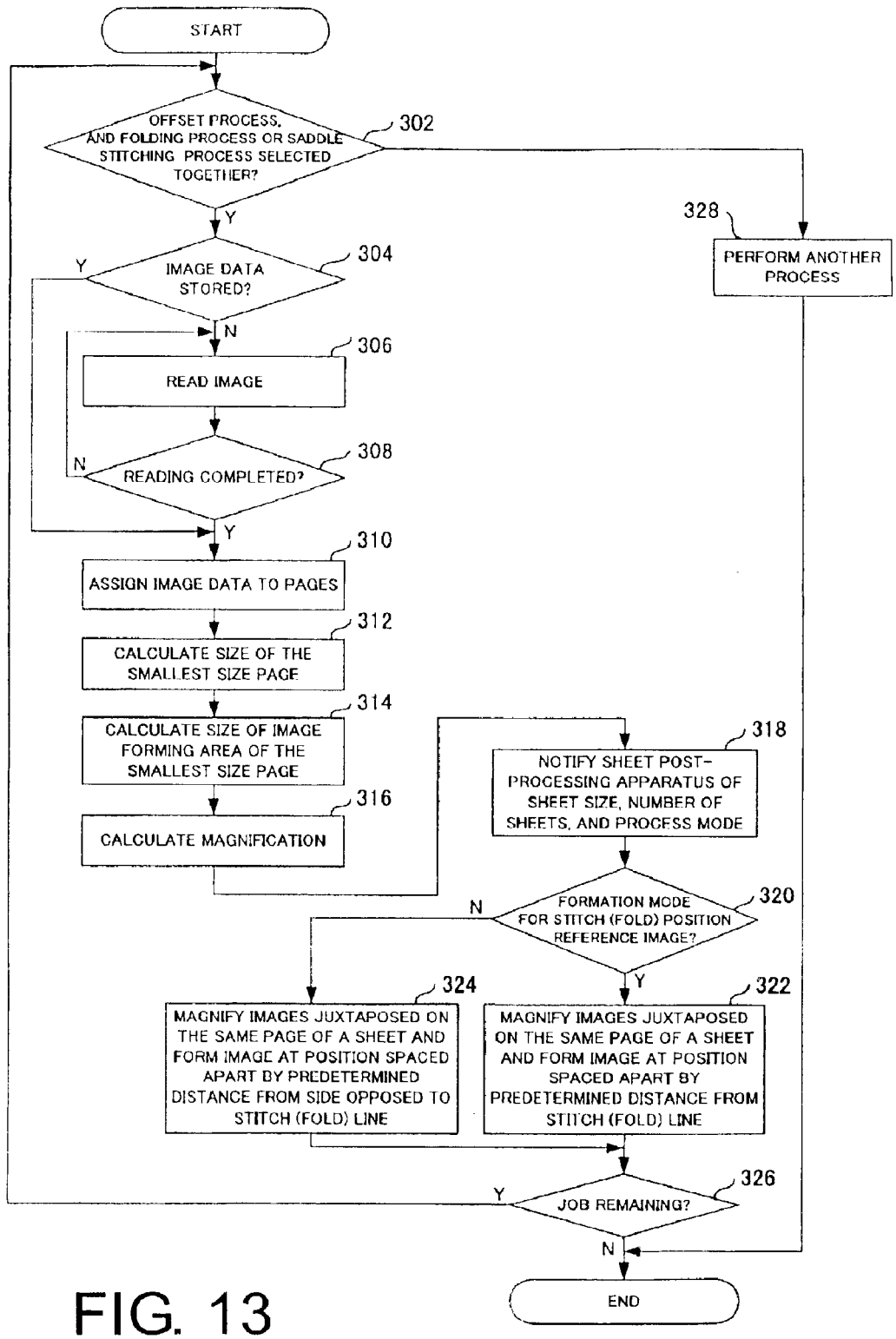
FIG. 13 is a flow diagram of an image forming routine carried out by a CPU of the controller of the digital copying apparatus.

As shown in FIG. 12, a controller 149 includes a central processing unit (CPU); a ROM for storing a program to be executed by the CPU and program data beforehand; a RAM for functioning as a work area for the CPU, and storing control data received from a controller 950 in the digital copying apparatus main unit 1 (see FIG. 1); and an interface. The controller 149 controls a sheet/sheet-stack conveyance system 149A, paddle system 149B, stapling/folding system 149C, alignment system 149D, lifting tray system 149E, sheet detector system 149F, door status detector system 149G, and selection switch system 149H. In FIG. 13, there are two identical components. One of two identical components positioned forward in FIG. 12 is referred to as a "front" component, and the other component positioned rear is referred to as a "rear" component as referred to FIG. 3.

The sheet/sheet-stack conveyance system 149A, functioning as an input to the controller 149, works for the conveyance of the sheets and sheet stack. The sheet/sheet-stack conveyance system 149A includes a sheet detector sensor 4 for detecting the sheet on the conveyance guide 3; edge detector sensors 54 and 85 for detecting the edge of the sheet stack; an arm detector sensor 77 for detecting the HP position of the pushing claw 13; HP position detector sensors 305 and 315 for detecting the home positions of the sheet pressing levers 300, 310, respectively; and a sheet stack conveyance roller HP sensor 161 for detecting the home position of the stack conveyance upper roller 51 when the stack conveyance upper roller 51 is away from the stack conveyance lower roller 52.

Output components of the controller 149 include the solenoid 22 for positioning the stopper 21 at one of the restraining position and retraction position; solenoids 301 and 311 for pressing the sheets on the right tray 8a and left tray 8c; the conveyance motor 162 for driving respectively the conveyance roller pair 5, discharge roller pair 6, stack conveyance upper roller 51, and stack conveyance lower roller 52 while rotating the upper roller movement cam 68 to move the stack conveyance upper roller 51; the stepping motor 70 for moving the conveyance lower roller 18, conveyance upper roller 19, and conveyance belt 12; and stepping motors 306 and 307 for moving the sheet pressing levers 300 and 310. The conveyance motor 162 and stepping motor 70 are controlled through motor drivers, and the solenoid 22 is controlled through a solenoid controller. The motor drivers and the solenoid controller are not shown in FIG. 12 (the same is true for the following systems).

The paddle system 149B includes, as input components thereof, a paddle HP sensor 163 for detecting a position of rotation of the paddle 17, and a conveyance roller HP sensor 164 for detecting a position of the conveyance upper roller 19 away from the conveyance lower roller 18, and as an output component, a paddle motor 165 for driving the paddle 17.

The stapling/folding system 149C includes, as input components thereof, a staple HP sensor 166 for detecting a completion of preparation of the head assembly 31 and the anvil assembly 32 for driving and folding a staple; a staple sensor 167 for detecting that a staple is set in the head assembly 31; a staple slide HP sensor 168 for detecting that the head assembly 31 and anvil assembly 32 are placed at the initial positions thereof in the sheet conveyance direction; a pushing plate HP sensor 169 for detecting the home position of the pushing plate 55; a clock sensor 171 for detecting the direction of rotation of the stapling/folding motor 170 to switch the rotation thereof to switch between staple unit driving and folding unit driving; and a safety switch 172 for detecting that the stapler unit 30 and folding unit 50 are enabled for operation.

The stapling/folding system 149C also includes, as output components thereof, the stapler slide motor 42 for rotating the guide screw shaft 36 to drive the head assembly 31 and anvil assembly 32 in a direction perpendicular to the sheet conveyance direction; and a stapling/folding motor 170 for driving the coupling device 44 of the stapler unit 30 in the forward rotation, and driving the coupling device 137 of the folding unit 50 in the reverse rotation.

The alignment system 149D includes, as input components, a forward alignment HP sensor 151 and backward alignment HP sensor 152 for detecting the home position of the alignment plates 9 to align both edges of the sheet on the process tray 8, and as an output component, forward and backward alignment motors 14 for moving the alignment plates 9. In the alignment motors 14, it is possible to set an amount of shifting in a direction perpendicular to the sheet and sheet stack conveyance direction.

The lifting tray system 149E includes, as an output component, the lifting tray motor 155 for moving the lifting tray 90, and as input components, the sheet surface sensor 93 for detecting the surface of the top sheet on the lifting tray 90, a lift clock sensor 150 for detecting an amount of rotation of the lifting tray motor 155, and upper limit switch 153 and lower limit switch 154 for limiting a range of lifting motion of the lifting tray 90.

The sheet detector system 149F determines whether the lifting tray 90 and folded sheet stack discharge stacker 80 hold the sheet or the sheet stack, and includes a lifting tray sheet sensor 156 for detecting the sheet stack on the lifting tray 90 and a folded sheet stack sensor 157 for detecting the sheet stack on the folded sheet stack discharge stacker 80. The sensors 157 and 158 detect the sheet in the sheet post-processing device 2 to alert an operator to the presence of the sheet or the sheet stack when the sheet stack remains at startup or the sheet stack is not removed for a predetermined period.

The door status detector system 149G detects the status of a door attached to the device frame 2A, and determines whether the sheet post-processing device 2 can be mounted to the digital copying apparatus main unit 1. The door status detector system 149G includes a front door sensor 158 and joint switch 159 for detecting whether the sheet post-processing device 2 is properly attached on the digital copying apparatus main unit 1.

The selection switch system 149H includes, as input components, a stapler selection switch 935 for selecting a stitching process to be performed on the sheet stack regardless of whether the stitching process is for saddle stitching or side stitching; a side stitched/unstitched sheet discharge tray selection switch 936 for selecting the discharging of a side stitched sheet or unstitched sheet to the lifting tray 90; and a saddle stitched and folded sheet discharge tray selection switch 937 for selecting the discharging of saddle stitched and folded sheets (stack of sheets) to the folded sheet stack discharge stacker 80. Although the touch panel 248 is used to select the process mode, the user may manually press one of these switches to select a desired process mode while visually checking the selected mode.

An operation of the digital copying apparatus 1A of the embodiment will be explained below with reference to the flow chart.

The CPU of the controller 950 allows the touch panel 248 to display a default screen through the display and operation controller 250. At this moment, in addition to the sheet size selection switch button, mode selection switch button, and stack destination selection switch button shown in FIG. 2, the touch panel 248 (or a monitor of the personal computer 210) displays a clear button for clearing the selected mode; an image reading button for reading an image from the original document D; a print mode selection switch button for switching between a both-side printing mode for printing images on both sides of the sheet and a one-side printing mode for printing images on one side of the sheet; a start button for starting the digital copying apparatus main unit 1 to form an image in the selected mode; a standby status or image forming enabled status of the digital copying apparatus 1A, and the number of the images formed sheets. It is possible to input all or a part of these selections and settings through the personal computer 210 or a manual switch such as the stapler selection switch 935 represented by a filled circuit shown in FIG. 1.

A concept of the offset mode will be described next. In the offset mode, the paddle 17, stopper 21, conveyance lower roller 18, and conveyance upper roller 19 work in cooperation so that the edges of the sheets S in the sheet conveyance direction discharged from the discharge roller pair 6 are successively shifted on the process tray 8 and first stack guide 27. The stapler unit 30 and/or folding unit 50 perform the stitching process and/or folding process at a predetermined stitching position and/or folding position.

Figure 20:
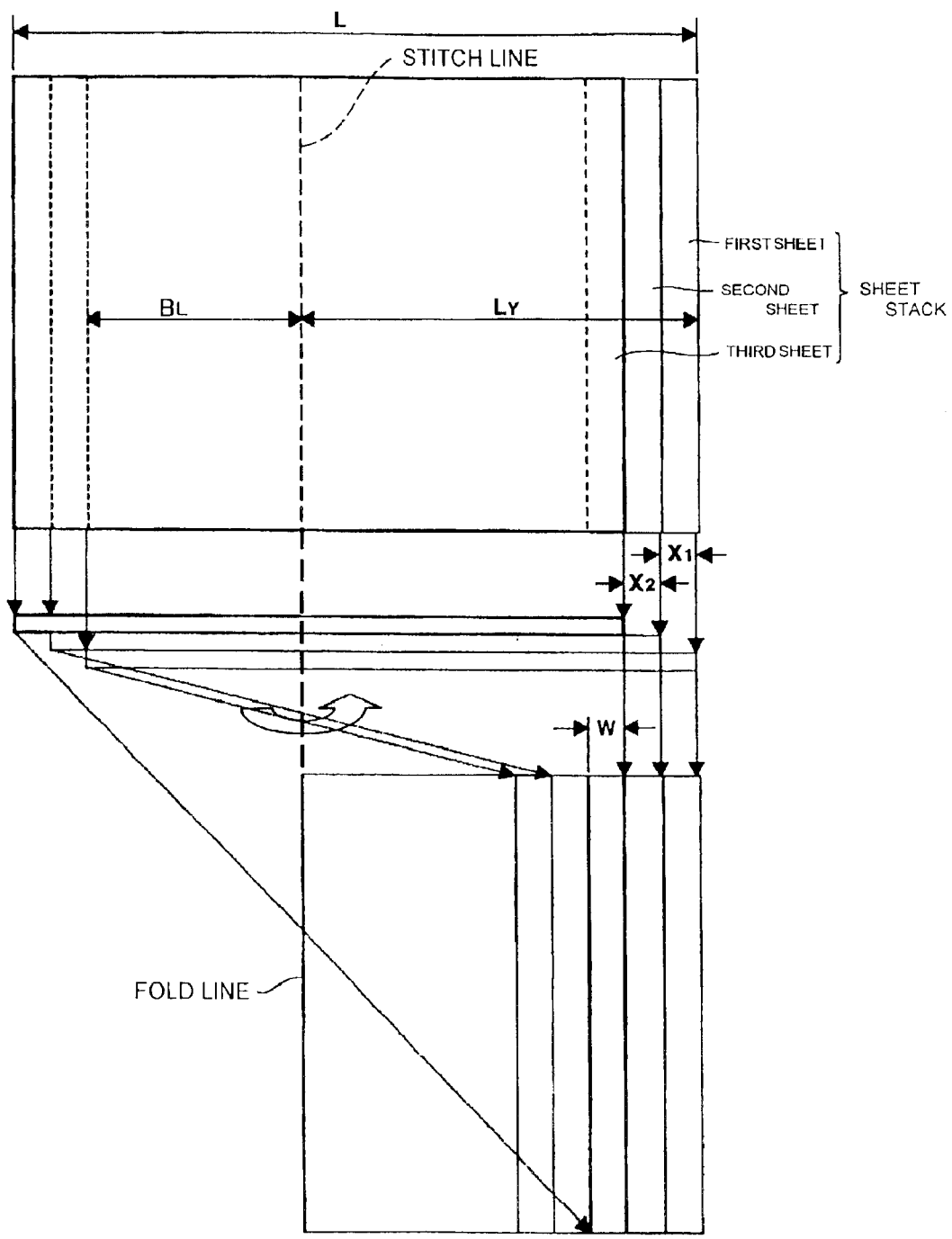
FIG. 20 is a view schematically showing an offset state, a stitch line, and a fold line of a sheet stack.

As shown in FIG. 20, a sheet stack is formed of three sheets, i.e. the first sheet as the outermost page during the folding process, the third sheet as the innermost page during the folding process, and the second sheet as a page in between. A shift of the second sheet with respect to the first (outer) sheet is defined as $X_1$, a shift of the third sheet with respect to the second sheet is defined as $X_2$, and likewise a shift of a Y-th sheet with respect to a (Y−1)-the sheet is defined as $X_{Y-1}$. Also, a shift between edges facing each other when the innermost Y-th sheet is folded is defined as W, and L (common size) represents a length of the sheet. A folding position $L_Y$ from the edge of the first sheet, namely, the outermost sheet, is defined by the following equation. A stitching position $L_Y$ from the edge of the first sheet, namely, the outermost sheet, is also defined by the following equation.

$$L_Y = \frac{L+W}{2} + (X1 + X2 + \cdots + X_{Y-1}) \quad (1)$$

In the offset mode, when viewed from above or below the sheet stack, the edges of the sheets are successively shifted so that each edge is visible. In the case that the stitching process is performed, the stitching position $L_Y$ is set at a position $((L-L_Y)<L_Y)$ closer to one end of the sheet stack (the left side in FIG. 20) than to the other end of the sheet stack (the right side in FIG. 20). In the case that the folding process is performed, the edge of the innermost sheet remain visible after the folding process.

The offset modes include three modes, namely, (A) an offset saddle stitch mode in which the stitching process is performed at the stitching position $L_Y$ and the folding process is performed at the folding position $L_Y$, (B) an offset stapling mode in which the stitching process is performed at the stitching position but no folding process is performed, and (C) an offset saddle mode in which the folding process is performed at the folding position but no stitching process is performed.

The operator selects one of the offset modes, and inputs values of the shifts X and W through the touch panel 147. For the sake of explanation, these modes will be explained in the case that the operator inputs a value a (for example 8 mm) as a default value of the shifts X and W ($X_1=X_2=\ldots=X_{Y-1}=a=8$ mm).

When the user presses one of the selection buttons displayed on the touch panel 248 followed by the start button, an image forming routine for forming an image on a sheet is carried out.

In the image forming routine shown in FIG. 13, in step 302, the controller 950 determines whether the offset process, and the folding process or saddle stitching process are selected together. If the answer to the determination in step 302 is negative, another process for forming an image on a sheet is performed in step 328 so that the sheet-post processing device 2 performs one of the sheet post-processing modes and then the image forming routine ends. The sheet post-processing modes include a non-stapling mode in which a sheet stack is placed in the lifting tray 90 without performing a stitching operation thereon, side stapling mode in which a sheet stack is placed in the lifting tray 90 after performing a stitching operation at least one position in one edge portion of the sheet stack in the direction of conveyance, and saddle stitching mode in which a stitching operation is performed at least at one position at half-way point across the length of the sheet in the sheet conveyance direction, the stitched sheet stack is folded at the stitch line into a booklet, and the booklet is collected in the folded sheet stack discharge stacker 80.

If the answer to the determination in step 302 is affirmative, the controller 950 determines whether image data is already stored in the hard disk 961. The hard disk 961 stores image data output from the personal computer 210 or image data the image input unit 200 has acquired by scanning the original document D. When the image data is output from the personal computer 210, the CPU in the controller 950 determines an ID for a folder for the image data input through numeric keys, and attaches a name for the ID. As for the image data acquired by the image input unit 200, the controller 950 presents a message on the touch panel 248 through the display and operation controller 250 subsequent to the image data acquisition, thereby asking the user whether to store or delete the image data. If the user desires to store the image data, the controller 950 requests the user to enter an ID for a folder for the image through numeric keys. When the ID is entered through the touch panel 248 or personal computer 210, the controller 950 determines in step 304 whether the image data is stored in the folder corresponding to the input ID.

If the answer to the determination in step 304 is affirmative, the routine proceeds to step 310. If the answer to the determination in step 304 is negative, the original document D is read by the automatic document feeder 940 in step 306. In step 308, the controller 950 determines whether the reading operation has been completed. When the image is read using the automatic document feeder 940, the completion of the reading operation of the original document D is detected by an empty sensor (not shown) in the automatic document feeder 940. If the original document is read on a page-by-page basis without using the automatic document feeder 940, the user is requested to press a particular button such as a "#" button. When the "#" button is pressed, the controller 950 determines that the reading operation has been completed.

In step 310, the image data is assigned for each page. In the both-side printing mode, for example, four pages are reserved for a single sheet. In the one-side printing mode, for example, two pages are reserved. If the number of pieces of input image data (a number of images) is 9 in the both-side printing mode, all image data can be printed if 2.25 sheets (the number of pieces of image data 9/the number of pages reserved for one page 4) are available. Since the decimal numbers are rounded up in practice, 3 sheets are required.

A ROM table stores the number of sheets and page assignment corresponding to the printing mode. More in detail, when three sheets are printed in the both-side printing mode, the table stores page assignment information that a first sheet bears page 1 and page 12 on a top surface thereof, while bearing page 2 and page 11 on a bottom surface thereof, that a second sheet bears page 3 and page 10 on a top surface thereof, while bearing page 4 and page 9 on a bottom surface thereof, and that a third sheet bears page 5 and page 8 on a top surface thereof, while bearing page 6 and page 7 on a bottom surface thereof (see FIG. 21(A)).

The pages of the sheets are associated with the image data (the image data is assigned to each page) based on the number of pieces of data (the number of images) of the input image data and the order of input (the order of designation of the pages if page information is contained in the image data input from the personal computer 210). If 9 pieces of image data are used, page 12 on the top surface of the first sheet, page 11 on the bottom surface of the first sheet, and page 10 on the top surface of the second sheet remain blank with no image formed thereon. In the order of input (the order of page designation), the image data is assigned on the remaining pages. For example, the first image data is assigned to page 1, and the second image data is assigned to page 2.

In step 312, a size of the smallest size page is calculated. For example, when a booklet shown in FIG. 20 and FIG. 21(A) contains 3 sheets of A4 sheet size with an offset a of 8 mm, a height dimension of all sheets of the booklet is 210 mm as listed in Table 1.

TABLE 1

| Sheet size | Height dimension (mm) × width dimension (mm) |
|---|---|
| A5 | 148 × 210 |
| A4 | 210 × 297 |
| A3 | 297 × 420 |

Figure 21A:
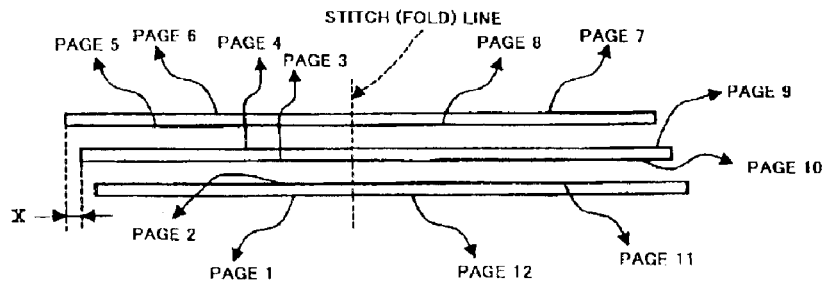
FIG. 21(A) is a view schematically showing a position of each sheet of a booklet composed of different size pages with reference to a stitch line or a fold line, and showing pages corresponding to the sheets when a both-side printing mode is selected.
Figure 21B:
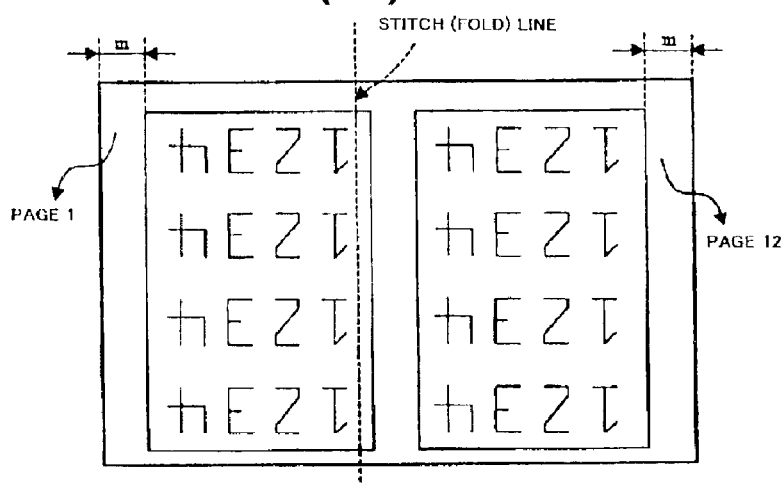
FIG. 21(B) is a view schematically showing original images formed next to each other on a sheet in an opposed edge referenced image forming mode in a conventional digital copying apparatus.
Figure 21C:
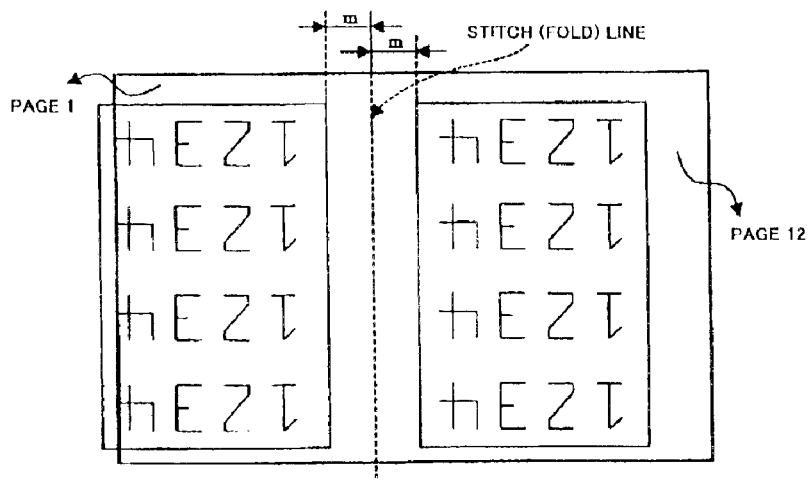
FIG. 21(C) is a view schematically showing original images formed next to each other on a sheet in a stitch line (fold line) referenced image forming mode in the conventional digital copying apparatus.

As shown in FIGS. 20 and 21(A), the smallest size page is page 1, and a width dimension $B_L$ across page 1 is $B_L = L - L_Y$. Here, L represents the width dimension of each sheet. As listed in the Table, an A4 sheet size has a width dimension of 297 mm. $L_Y$ is calculated by substituting the offset a=8 mm in the above equation. In this example, $B_L = 297 - \{(297+8)/2 + 8 \times 2\} = 128.5$ (mm). The calculation in step 312 results in a size of the smallest size page of 210 (mm) × 128.5 (mm).

Figure 14A:
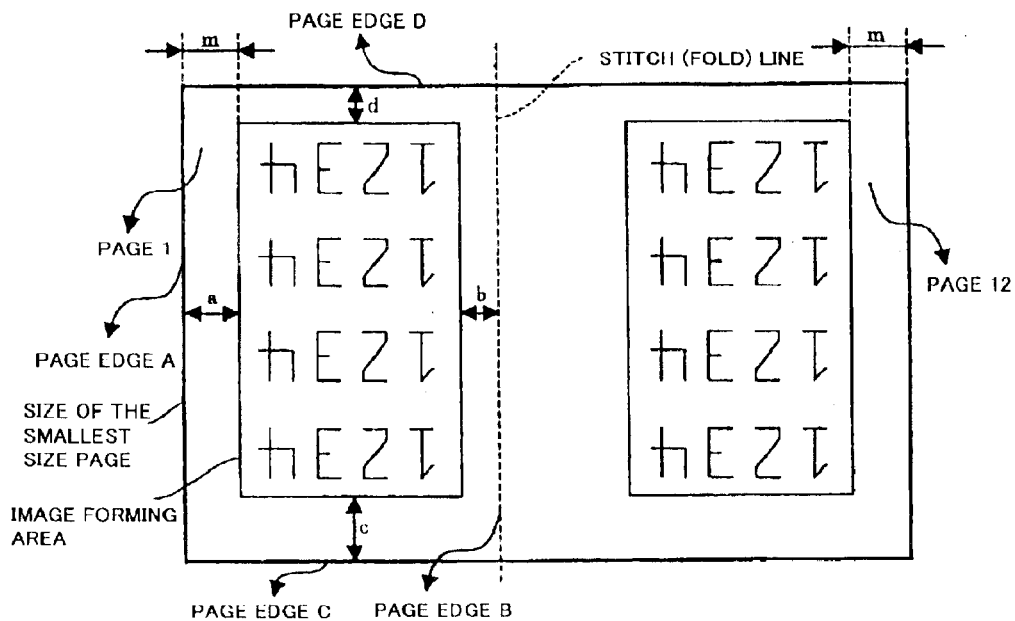
Figure 14B:
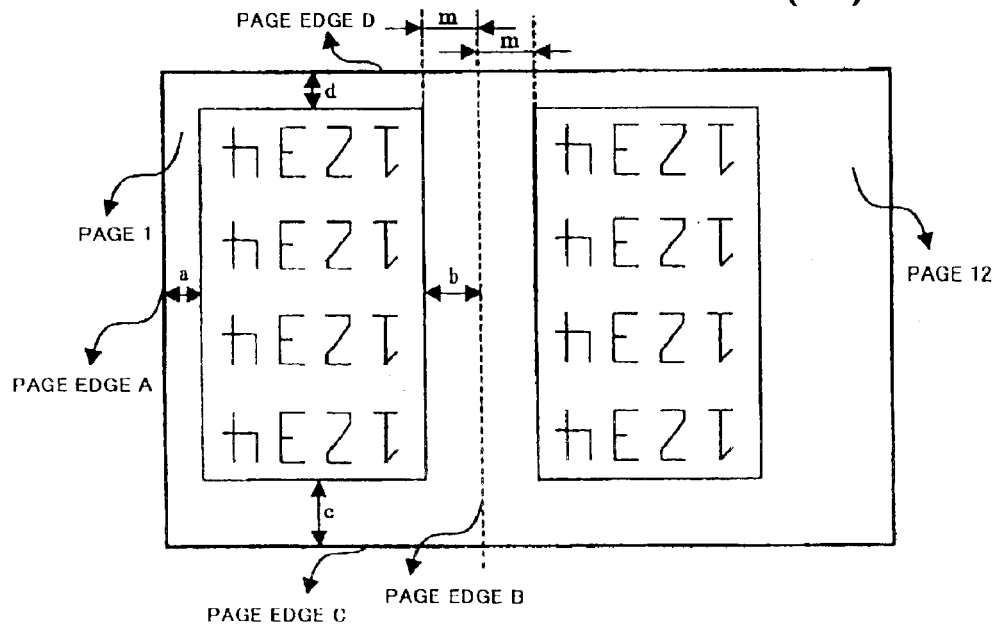

In step 314, a size of an image forming area, which is an area of the size of the smallest size page (page 1) excluding margins thereof, is calculated. FIG. 14(A) shows default margins, for example, a margin a from an edge A is 15 mm, a margin b from a page border B is 10 mm, a margin c from an edge C is 15 mm, and a margin d from an edge D is 10 mm (FIG. 14(B) shows a margin a of 10 mm, a margin b of 15 mm, a margin c of 15 mm, and a margin d of 10 mm). To modify the default margins, the user may input desired margins using the setting button. In step 314, the size of the image forming area of page 1 is a height of 185 (mm) (=210−15−10) and a width of 103.5 (mm) (=128.5−15−10).

In step 316, the controller 950 calculates an image magnification at which the original image read in step 306 (or stored in the hard disk 961) is allowed to fit the image forming area of the height of 185 (mm) and width of 103.5 (mm) calculated in step 314. Such a magnification process is any of known techniques in the field of digital copying apparatus.

In step 318, the controller 950 notifies the CPU of the controller 149 in the sheet-post processing device 2 of the sheet size, the number of sheets, and the processing mode. In step 320, the controller 950 determines whether the stitch-line (fold-line) referenced image forming mode is selected. When two original images are juxtaposed on a sheet in the image forming process, one of the two modes, i.e. the stitch-line (fold-line) referenced image forming mode and the opposed-edge referenced image forming mode is selected.

FIG. 14(A) shows the opposed-edge referenced image forming mode in which the image is formed on each page with a spacing allowed from the other edge (forming the page edge A) opposite to a common line (the page border B such as the stitch line or the fold line) along which each page is stitched or folded. The spacing has a width of m. FIG. 14(B) shows the stitch-line (fold-line) referenced image forming mode in which the image is formed with a spacing allowed from the stitch line or the fold line, the spacing having a width of m. The page edge A is also referred to as a free edge, and the common page border is also referred to as an opposed line.

If the answer to the determination in step 320 is affirmative, images to be formed on the same surface of the sheet are varied in magnification and then formed on the respective pages at a position spaced apart from the stitch line (or the fold line) by the distance m. The routine then proceeds to step 326. As shown in FIG. 21(A), the original image assigned in step 310 at the magnification calculated in step 316 is formed on the surface of the first sheet bearing page 1 and page 12 with the spacing having the width m allowed from the stitch line (or the fold line), as shown in FIG. 14(B). The spacing width m may be the above-referenced default margin, such as 15 mm (the margin b is 10 mm).

When a paper feed signal is output from the controller 950, a sheet is fed from one of the cassettes 910, 911, and 913 depending on the input sheet size. The sheet is corrected in skew and adjusted in timing by a timing roller pair in the sheet feeder 909, and is then fed to the image forming assembly 902. The CPU in the controller 950 produces the image data of a first sheet by varying the two original images assigned to the one surface of the first sheet spaced apart from the stitch line (or the fold line) by the distance m and directs a laser beam from the laser unit 922 to the photoconductive drum 914 in response to the image data of the one sheet line by line. Since the photoconductive drum 914 is charged beforehand by the primary charging unit 919, an electrostatic latent image is formed on the photoconductive drum 914. The electrostatic latent image is developed into a toner image on the photoconductive drum 914 by the development unit 915.

In the image forming assembly 902, the toner image on the photoconductive drum 914 is transferred to the supplied sheet by the transfer unit 916. The sheet bearing the toner image is charged by the separating charging unit 917 into a polarity opposite from that of the transfer unit 916, and is then separated from the photoconductive drum 914.

The sheet separated from the photoconductive drum 914 is conveyed to the fixing unit 904 by the endless conveyance belt 920. The transferred image is thus permanently fixed onto the sheet by the fixing unit 904. An image is thus formed (recorded) on the sheet. During the both-side printing mode, images are formed on the other surface (page 2 and page 11 shown in FIG. 21(A)) of the first sheet at positions spaced apart by the spacing width m from the stitch line (or the fold line) through the duplexer 921 as in the top surface of the first sheet.

The sheet bearing the images is then discharged by the discharge roller pair 905 into the sheet post-processing device 2 from the copying apparatus main unit 1. In this way, images are formed on the sheets fed from the sheet feeder 909, and the image bearing sheets are successively discharged into the sheet post-processing device 2.

If the answer to the determination in step 320 is negative, the images to be juxtaposed on the same surface of the sheet are varied in magnification, and formed with the spacing having the width m allowed from the edges opposite to the stitch line (or the fold line), and the routine proceeds to step 326. Specifically, as shown in FIG. 21(A), the original image assigned in step 310 at the magnification calculated in step 316 is formed on the surface of the first sheet bearing page 1 and page 12 with the spacing having the width m from the edge opposite to the stitch line (or the fold line) as shown in FIG. 14(C). During the both-side printing mode, images are formed on the other surface of the first sheet through the duplexer 921. The image bearing sheets are successively discharged into the sheet post-processing device 2.

The controller 950 determines in step 326 whether there remain jobs. If the answer to the determination in step 326 is affirmative, the routine loops to step 302. If the answer to the determination in step 326 is negative, the image forming routine ends.

Figure 22:
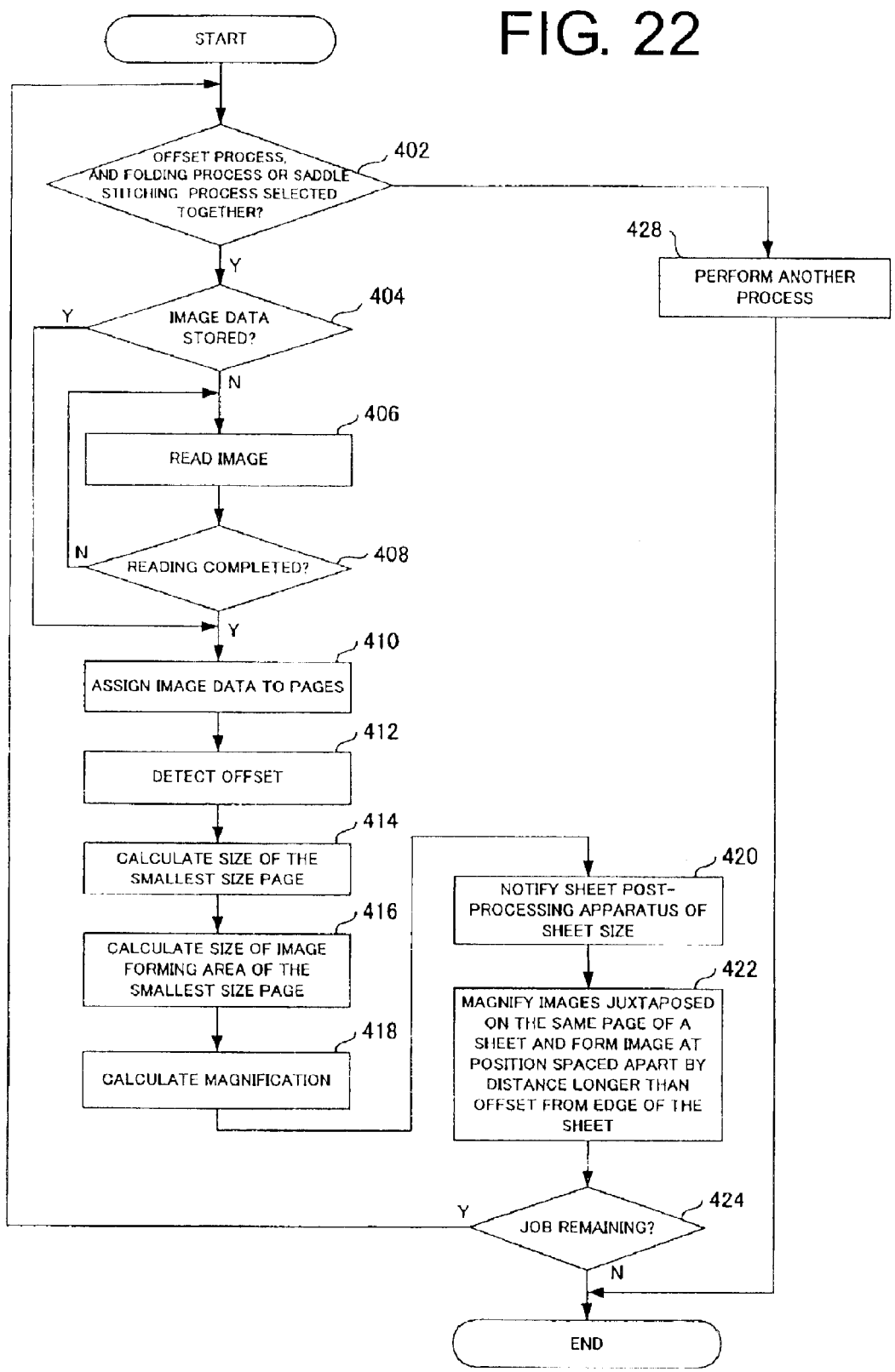
FIG. 22 is a flow diagram of an image forming routine carried out by the CPU of the controller of the digital copying apparatus.

An image forming routine of a second embodiment of the present invention is shown in FIGS. 22 and FIGS. 23(A)–23(C). As shown in FIG. 22, steps 402–410 and step 428 are respectively identical to steps 302–310 and step 328 in the first embodiment shown in FIG. 13, and the discussion thereof is omitted here.

In step 412, an offset a of 8 mm is detected. In step 414, a size of the smallest size page is calculated. For example, when a booklet shown in FIG. 23(A) contains three sheets of A4 sheet size with an offset a of 8 mm, a height dimension of all sheets of the booklet is 210 mm as listed in the Table 1.

Figure 23A:
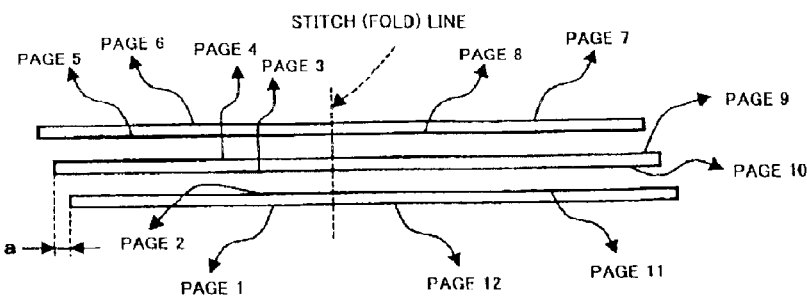

As shown in FIGS. 20 and 23(A), the smallest size page is page 1, and a width dimension $B_L$ across page 1 is $B_L = L - L_Y$. Here, L represents the width dimension of each sheet. As listed in the Table 1, an A4 sheet size has a width dimension of 297 mm. $L_Y$ is calculated by substituting the offset a=8 mm in the above equation. In this example, $B_L = 297 - \{(297+8)/2 + 8 \times 2\} = 128.5$ (mm). The calculation in step 414 results in a size of the smallest size page of 210 (mm)×128.5 (mm).

Figure 23B:
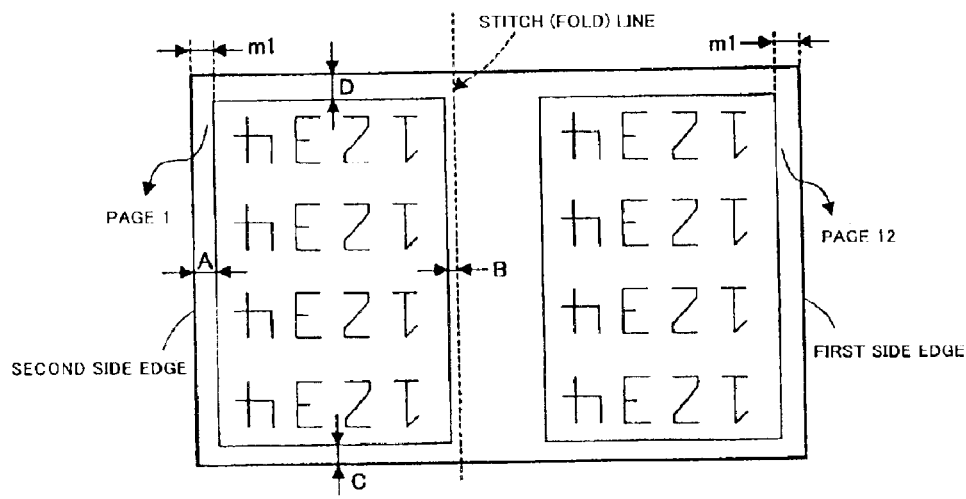

In step 416, a size of an image forming area, which is an area of the size of the smallest size page (page 1) excluding margins thereof, is calculated. FIG. 23(B) shows default margins, for example, a margin A from the other edge is 10 mm (equal to a distance m1 to be discussed later), a margin B from the stitch line (fold line) is 5 mm, a margin C from a page bottom edge is 10 mm, and a margin D from a page top edge is 15 mm. The margin A is set to be a default value larger than the offset a (in FIG. 23(C), the margin A=10 mm, margin B'=B+a=13 mm, margin C=10 mm, and margin D=15 mm). To modify the default margins, the user may input desired margins using the setting button. In step 416, the size of the image forming area of page 1 is a height of 185 (mm) (=210−margin C−margin D) and width of 113.5 (mm) (=128.5−margin A−margin B).

In step 418, the controller 950 calculates an image magnification at which the original image read in step 406 (or stored in the hard disk 961) is allowed to fit the image forming area of the height of 185 (mm) and width of 113.5 (mm) calculated in step 416. Such a magnification process is any of known techniques in the field of digital copying apparatus.

Figure 23C:
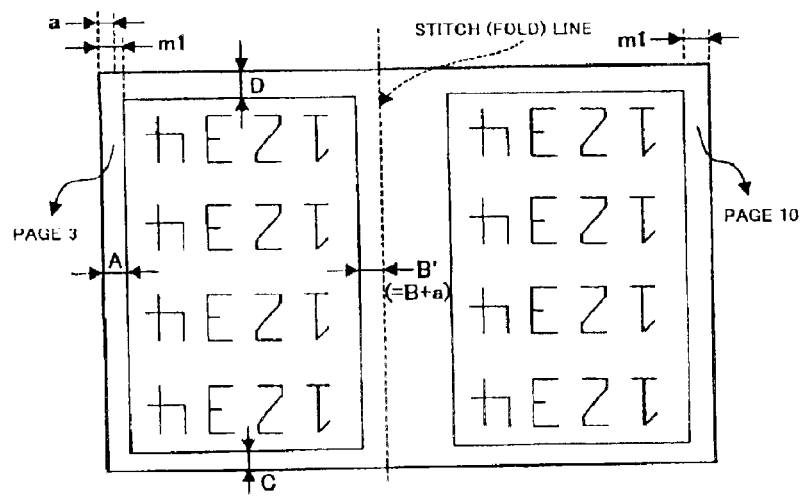

In step 420, the controller 950 notifies the CPU of the controller 149 in the sheet-post processing device 2 of the sheet size, the number of sheets, the processing mode, and the offset a. In step 422, images to be juxtaposed on the same surface of the sheet are varied in magnification and formed in areas respectively spaced apart from one edge and the other edge of the sheet by the distance m1 as shown in FIGS. 23(B) and 23(C), and then the routine proceeds to step 424.

Specifically as shown in FIG. 23(A), the original image assigned in step 410 is varied to the magnification calculated in step 418 and is arranged on the surface of the first sheet bearing page 1 and page 12 at the areas spaced apart by the distance m1 from the one edge and the other edge of the first sheet as shown in FIG. 23(B). The distance m1 set to be a value larger than the offset a (m1≧a), a margin B' from the stitch line (the fold line) on page 3 is a sum of the margin B and the offset a (see FIG. 23(C)), and a margin B" (not shown) from the stitch line (the fold line) on page 5 is a sum of the margin B and twice the offset a (B"=B+2a).

When a paper feed signal is output from the controller 950, a sheet is fed from one of the cassettes 910, 911, and 913 depending on the input sheet size. The sheet is corrected in skew and adjusted in timing by a timing roller pair in the sheet feeder 909, and is then fed to the image forming assembly 902. The CPU in the controller 950 produces the image data of a first sheet by varying in magnification and arranging the two original images assigned to the one surface of the first sheet spaced apart from a forward edge (one edge) and a backward edge (the other edge) by the distance m1 and directs a laser beam from the laser unit 922 to the photoconductive drum 914 in response to the image data for the one sheet line by line. Since the photoconductive drum 914 is charged beforehand by the primary charging unit 919, an electrostatic latent image is formed on the photoconductive drum 914. The electrostatic latent image is developed into a toner image on the photoconductive drum 914 by the development unit 915.

In the image forming assembly 902, the toner image on the photoconductive drum 914 is transferred to the supplied sheet by the transfer unit 916. The sheet bearing the toner image is charged by the separating charging unit 917 into a polarity opposite from that of the transfer unit 916, and is then separated from the photoconductive drum 914.

The sheet separated from the photoconductive drum 914 is conveyed to the fixing unit 904 by the endless conveyance belt 920. The transferred image is thus permanently fixed onto the sheet by the fixing unit 904. An image is thus formed (recorded) on the sheet. During the both-side printing mode, images are formed on the other surface (page 2 and page 11 shown in FIG. 23(A)) of the first sheet with the spacing having the width of m1 allowed from the respective page edges through the duplexer 921 as in the top surface of the first sheet. The sheet bearing the images is then discharged by the discharge roller pair 905 into the sheet post-processing device 2 from the digital copying apparatus main unit 1. In this way, images are formed on the sheets fed from the sheet feeder 909, and the image bearing sheets are successively discharged into the sheet post-processing device 2.

The controller 950 determines whether there remain jobs in step 424. If the answer to the determination in step 424 is affirmative, the routine loops to step 402 to process the remaining jobs. If the answer to the determination in step 424 is negative, the image forming routine ends.

Figure 24:
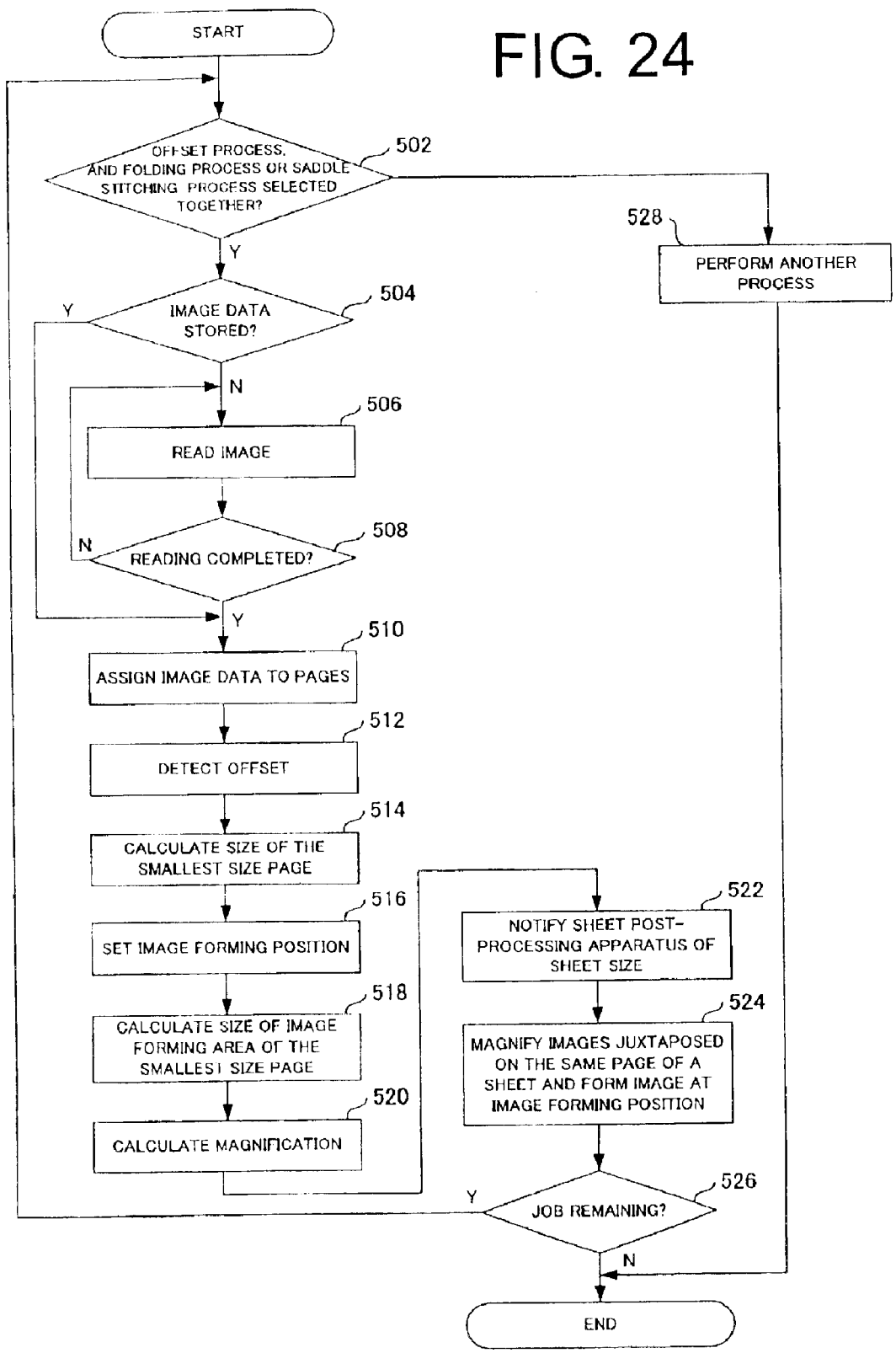
FIG. 24 is a flow diagram of an image forming routine carried out by the CPU of the controller of the digital copying apparatus.

An image forming routing of a third embodiment of the present invention is shown in FIGS. 24, FIGS. 25(A)–25(C), and FIGS. 26(A)–26(C). As shown in FIG. 24, steps 502–510 and step 528 are respectively identical to steps 302–310 and step 328 in the first embodiment shown in FIG. 13, and the discussion thereof is omitted here.

In step 512, an offset a of 8 mm is detected. In step 514, a size of the smallest size page is calculated. For example, when a booklet shown in FIG. 25(A) contains 3 sheets of A4 sheet size with an offset a of 8 mm, a height dimension of all sheets of the booklet is 210 mm as listed in the Table 1.

Figure 25A:
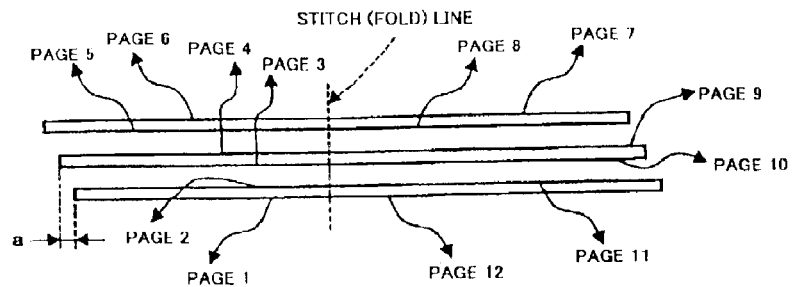

As shown in FIGS. 20 and 25(A), the smallest size page is page 1, and a width dimension $B_L$ across page 1 is $B_L = L - L_Y$. Here, L represents the width dimension of each sheet. As listed in the Table, an A4 sheet size has a width dimension of 297 mm. $L_Y$ is calculated by substituting the offset a=8 mm in the above equation. In this example, $B_L = 297 - \{(297+8)/2 + 8 \times 2\} = 128.5$ (mm). The calculation in step 512 results in a size of the smallest size page of 210 (mm)×128.5 (mm).

Figure 25B:
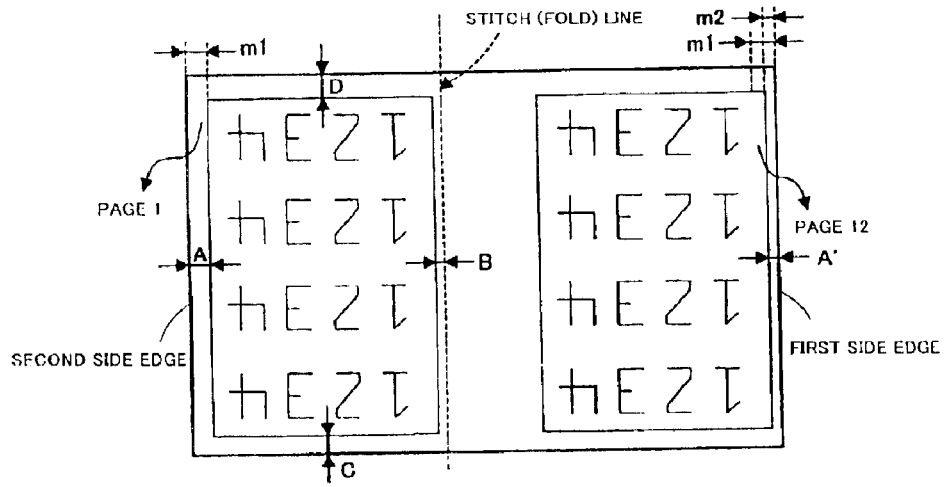
Figure 25C:
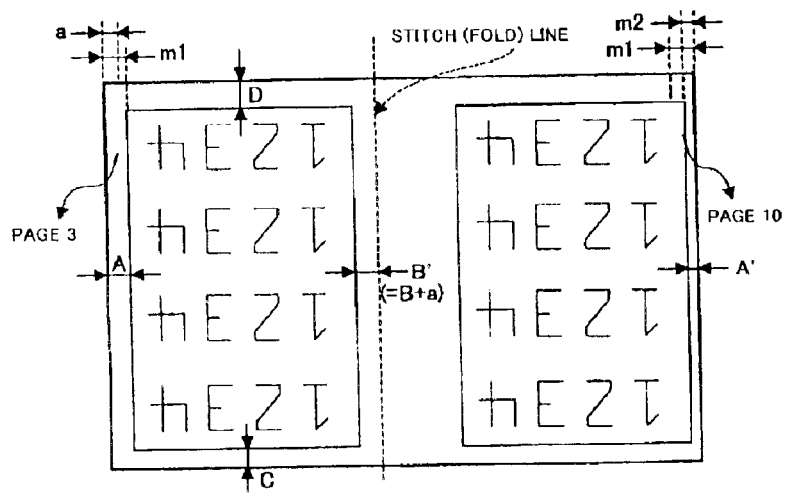

In step 516, an image forming position is set to each sheet forming a sheet stack. FIG. 25(B) shows default margins on page 1, for example, a margin A from a page edge is 10 mm (equal to a distance m1 be discussed later), a margin B from the stitch line (fold line) is 5 mm, a margin C from a page bottom edge is 10 mm, and a margin D from a page top edge is 15 mm. The margin A is set to be a default value larger than the offset a. A margin A' from the page edge (one edge) on page 12 is set to be a default value of 5 mm (equal to a distance m2 to be discussed later) smaller in width than the offset a. Although page 3 (like page 5) has a margin A of 10 mm from the page edge like page 1 as shown in FIG. 25(C), a margin B' (B+a) from the stitch ling (the fold line) is set to be 13 mm (B+2a=21 mm on page 5) because there is an offset between the sheet of page 1 and the sheet of page 2. As on page 12, a margin A' from the page edge is set to be 5 mm on page 10 (and also on page 8). On one surface of each sheet (the bottom surface of each sheet in FIG. 25(A)), the margin C from the page bottom edge and the margin D from the page top edge are set to be the same as on page 1.

Figure 26A:
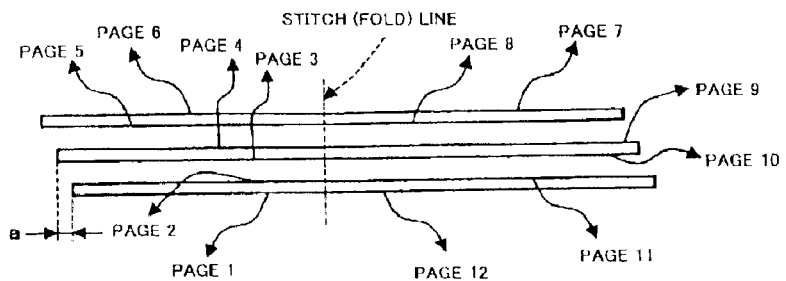
Figure 26B:
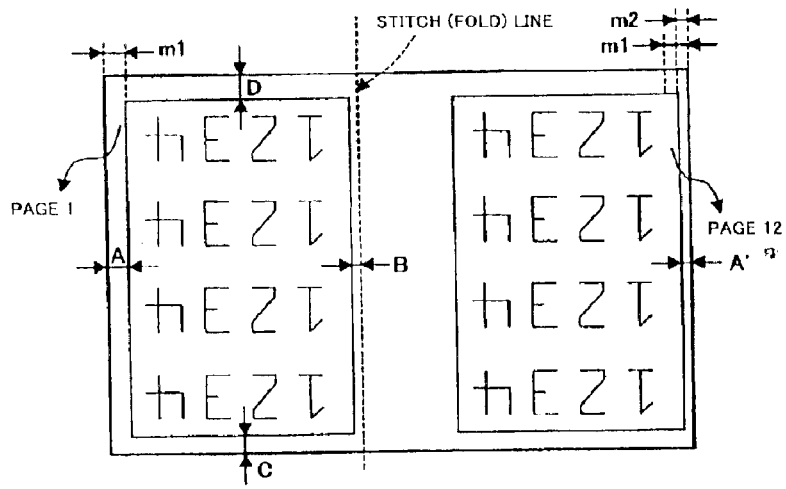
Figure 26C:
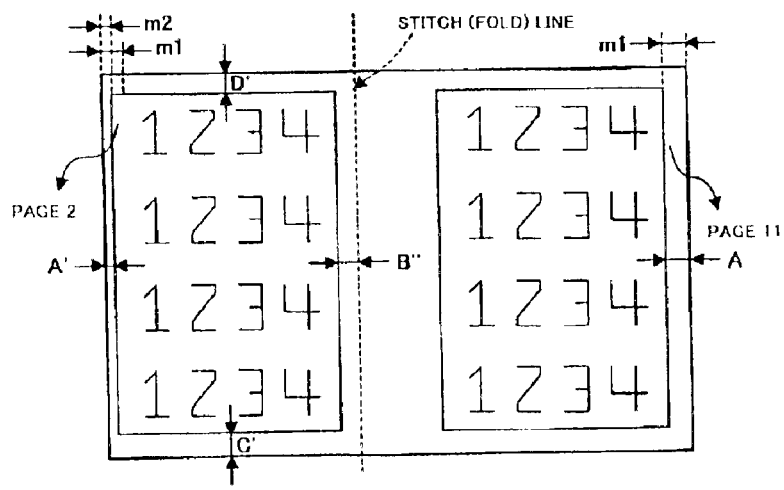

As shown in FIG. 26(C), on page 2, i.e., on the other surface of (the top surface of each sheet in FIG. 26(A)) of page 1, a margin A' from the page edge is set to be 5 mm (equal to the distance m2), and a margin B" (=A+B−A') from the stitch line (the fold line) is set to 10 mm. On page 11, i.e. on the other surface of page 12, a margin A is set to be 10 mm (equal to the distance m1). A margin C' from the page bottom edge and a margin D' from the page top edge, on the other surface of each sheet shown in FIG. 26(C) (on the top surface of each sheet shown in FIG. 26(A)) are respectively set to be 15 mm and 10 mm, reversed from the setting on page 1. Page 4 and page 9, and page 6 and page 7 are similarly arranged, except that the margin B" from the stitch line (the fold line) is successively increased in steps of offset a. FIGS. 26(B) and 26(C) are drawn for convenience of explanation, and are substantially identical to FIGS. 25(B) and 25(C), respectively.

In step 516, a margin A (of 10 mm, for example) is set in each of odd-number pages and a margin A' (of 5 mm, for example) is set on each of even-number pages so that the image formation position is different from odd-number page to even-number page. The distance from one edge or the other edge on an even-number page is shorter than the distance from one edge or the other edge on an odd-number page, and the stitch line (the fold line) is closer to the other edge of each sheet than to the one edge of the sheet forming a sheet stack (see FIGS. 25(A)–25(C) and FIGS. 26(A)–26(C)). To modify these default settings, the user may input desired values using the setting button.

In step 518, a size of an image forming area, which is an area of the size of the smallest size page (page 1) excluding margins thereof, is calculated. In step 518, the size of the image forming area of page 1 is a height of 185 (mm) (=210−margin C−margin D) and width of 113.5 (mm) (=128.5−margin A−margin B).

In step 520, the controller 950 calculates an image magnification at which the original image read in step 506 (or stored in the hard disk 961) is allowed to fit the image forming area of the height of 185 (mm) and width of 113.5 (mm) calculated in step 518. Such a magnification process is any of known techniques in the field of digital copying apparatus.

In step 522, the controller 950 notifies the CPU of the controller 149 in the sheet-post processing device 2 of the sheet size, the number of sheets, the processing mode, and the offset a. In step 524, images to be juxtaposed on the same surface of the sheet are varied in magnification and formed in areas respectively spaced apart from one edge and the other edge of the sheet by the distances m1 and m2 as shown in FIGS. 25(B) and 25(C) and FIGS. 26(B) and 26(C).

As shown in FIG. 25(A), the original images assigned in step 510 are varied to the magnification calculated in step 520 and arranged on the surface of the first sheet bearing page 1 and page 12 spaced apart from the other edge and the one edge of the sheet by the distances m1 and m2, respectively, on one surface of the first sheet as shown in FIGS. 25(B) and 25(C) and FIGS. 26(B) and 26(C). The distance m1 is set to be a value larger than the offset a (m1>a), the distance m2 is set to be a value smaller than the offset a (m2<a), and the relationship of m1>a>m2 holds.

When a paper feed signal is output from the controller 950, a sheet is fed from one of the cassettes 910, 911, and 913 depending on the input sheet size. The sheet is corrected in skew and adjusted in timing by a timing roller pair in the sheet feeder 909, and is then fed to the image forming assembly 902.

As shown in FIG. 25(B) and FIG. 26(B), the CPU in the controller 950 produces the image data of a first sheet by varying in magnification and arranging the two original images assigned to the one surface of the first sheet spaced apart from a forward edge (one edge) and a backward edge (the other edge) by the distance m1 and the distance m2 respectively, and directs a laser beam from the laser unit 922 to the photoconductive drum 914 in response to the image data for the one sheet line by line. Since the photoconductive drum 914 is charged beforehand by the primary charging unit 919, an electrostatic latent image is formed on the photoconductive drum 914. The electrostatic latent image is developed into a toner image on the photoconductive drum 914 by the development unit 915.

In the image forming assembly 902, the toner image on the photoconductive drum 914 is transferred to the supplied sheet by the transfer unit 916. The sheet bearing the toner image is charged by the separating charging unit 917 into a polarity opposite from that of the transfer unit 916, and is then separated from the photoconductive drum 914.

The sheet separated from the photoconductive drum 914 is conveyed to the fixing unit 904 by the endless conveyance belt 920. The transferred image is thus permanently fixed onto the sheet by the fixing unit 904. An image is thus formed (recorded) on the sheet. During the both-side printing mode, images are formed on the other surface (page 2 and page 11 shown in FIGS. 26(A) and 26(C)) of the first sheet at positions spaced apart from the forward edge (one edge) and the backward edge (the other edge) of the sheet by the distances m1 and m2 respectively through the duplexer 921.

The sheet bearing the images is then discharged by the discharge roller pair 905 into the sheet post-processing device 2 from the digital copying apparatus main unit 1. In this way, images are formed on the sheets fed from the sheet feeder 909, and the image bearing sheets are successively discharged into the sheet post-processing device 2.

The controller 950 determines whether there remain jobs in step 526. If the answer to the determination in step 526 is affirmative, the routine loops to step 502 to process the remaining jobs. If the answer to the determination in step 526 is negative, the image forming routine ends.

In step 318, the CPU in the controller 149 of the sheet-post processing device 2 acquires, from the CPU in the controller 950 of the digital copying apparatus main unit 1, information required for processing, and shifts blocks of the sheet-post processing device 2 from a standby state to a ready state and waits until the sheets are discharged from the digital copying apparatus main unit 1.

An operation of the sheet-post processing device 2 will be discussed in detail in connection with (A) the offset saddle stitch mode in which the offset input switch, saddle stitch processing input switch, and fold processing input switch are all turned on, (B) the offset stapling mode in which the offset input switch, and saddle stitch processing input switch are turned on while the fold processing input switch is turned off, (C) the offset saddle mode in which the offset input switch, and fold processing input switch are turned on while the saddle stitch processing input switch is turned off.

When the offset saddle stitching mode is selected, the controller 149 activates the stapler slide motor 42 to move the head assembly 31 and anvil assembly 32 to the initial position to be detected by the staple slide HP sensor 168. The controller 149 turns on the solenoid 22, thereby placing the stopper 21 at the restraining position. The conveyance upper roller 19 is situated at the spaced position.

The controller 149 activates the conveyance motor 162, thereby rotating the conveyance roller pair 5 and discharge roller pair 6, and then waits in the standby state until the discharge roller pair 905 of the digital copying apparatus main unit 1 discharges the sheet. When the sheet is discharged from the digital copying apparatus main unit 1, the conveyance roller pair 5 and discharge roller pair 6 convey the sheet to the process tray 8. When the sheet detector sensor 4 detects the first sheet, the controller 149 measures start timings of the alignment motor 14 for moving the alignment plates 9 and paddle motor 165 for rotating the paddle 17.

Figure 15A:
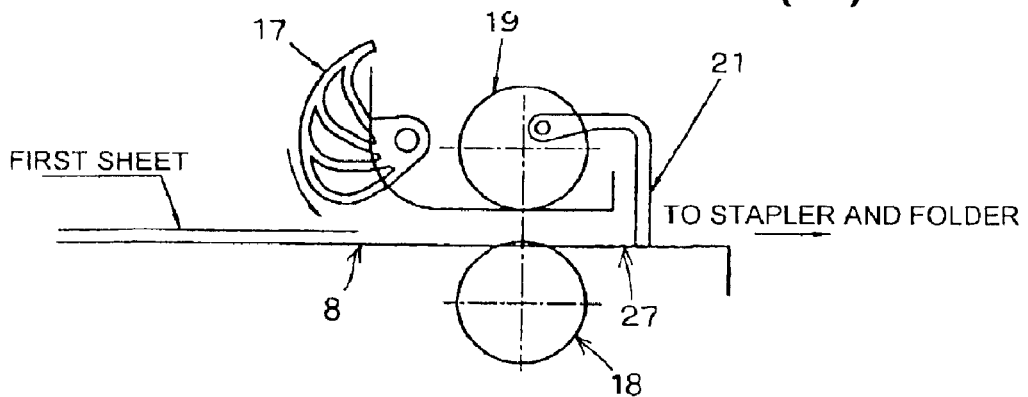

As shown in FIG. 15(A), when the first sheet is discharged to the process tray 8, the alignment motor 14 and paddle motor 165 are activated. In response, the alignment plates 9 move in the width direction perpendicular to the sheet conveyance direction, and align both edges of the sheet. The paddle 17 rotates around the axis 17*a* thereof by one revolution to move the first sheet with the tilted surface of the process tray 8 and first stack guide 27 until the forward edge of the first sheet abuts against the sidewall of the leg of the stopper 21 at the restraining position.

Figure 15B:
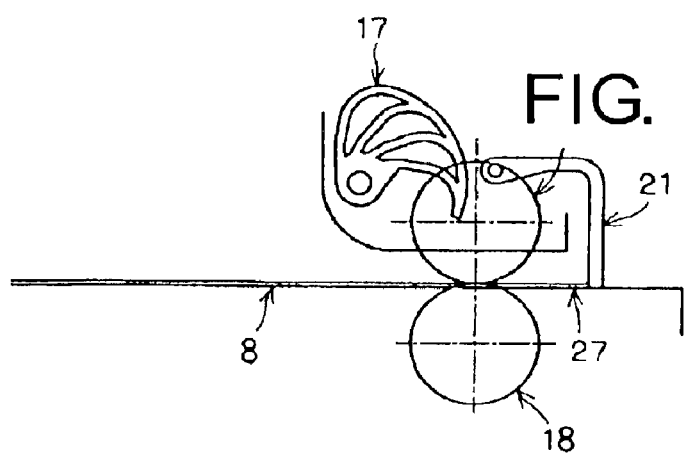
Figure 15C:
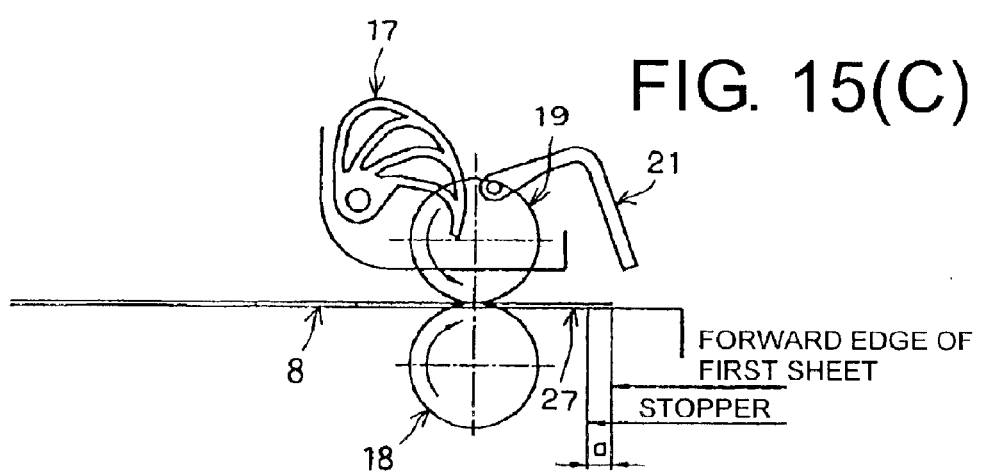

The conveyance upper roller 19 is shifted from the spaced position to the contact position to nip the first sheet with the conveyance lower roller 18 (see FIG. 15(B)). The stopper 21 is then moved to the retraction position. With the stepping motor 70 rotating, the first sheet nipped between the conveyance lower roller 18 and conveyance upper roller 19 is moved toward the stapler unit 30 by an offset of a from the sidewall of the stopper 21 abutting against the forward edges. Then, the stepping motor 70 stops rotating the conveyance lower roller 18 and conveyance upper roller 19 (see FIG. 15(C)).

Figure 16A:
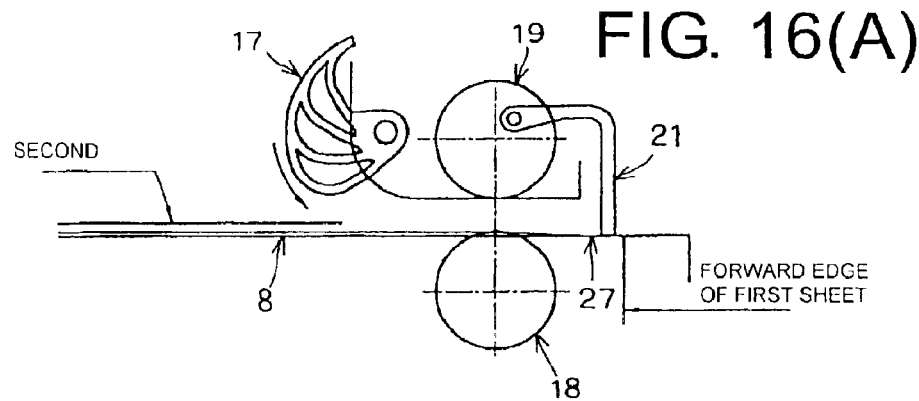

When the solenoid 22 is turned on, the conveyance upper roller 19 is then moved to the spaced position from the contact position thereof with the bottom face of the leg of the stopper 21 pressing the forward edge of the first sheet against the first stack guide 27 serving as a receiver for the n number of the sheets. When the second sheet is discharged into the process tray 8, the paddle motor 165 starts rotating (see FIG. 16(A)).

Figure 16B:
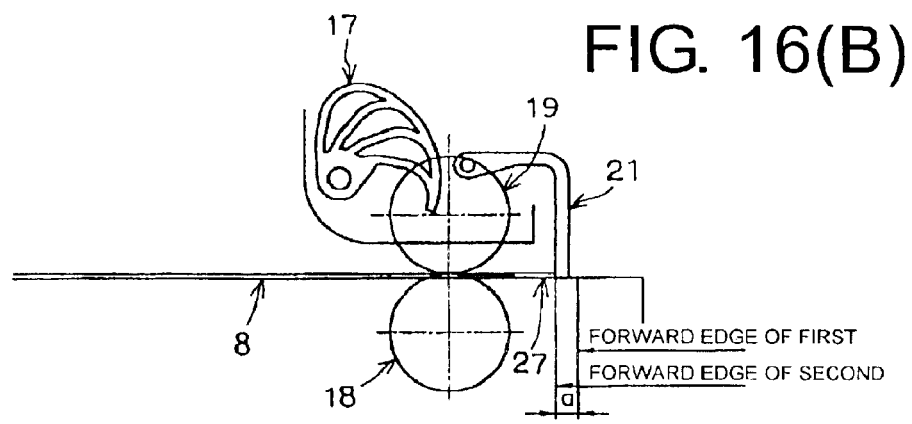

The paddle 17 rotates by one revolution to move the second sheet S to a position where the forward edge of the second sheet S abuts against the sidewall of the leg of the stopper 21 at the restraining position. At this time, there is an offset (shift) of a between the forward edge of the first sheet S and the forward edge of the second sheet S. Then, the conveyance upper roller 19 moves from the spaced position to the contact position to nip the first and second sheets with the conveyance lower roller 18 (see FIG. 16(B)).

Figure 16C:
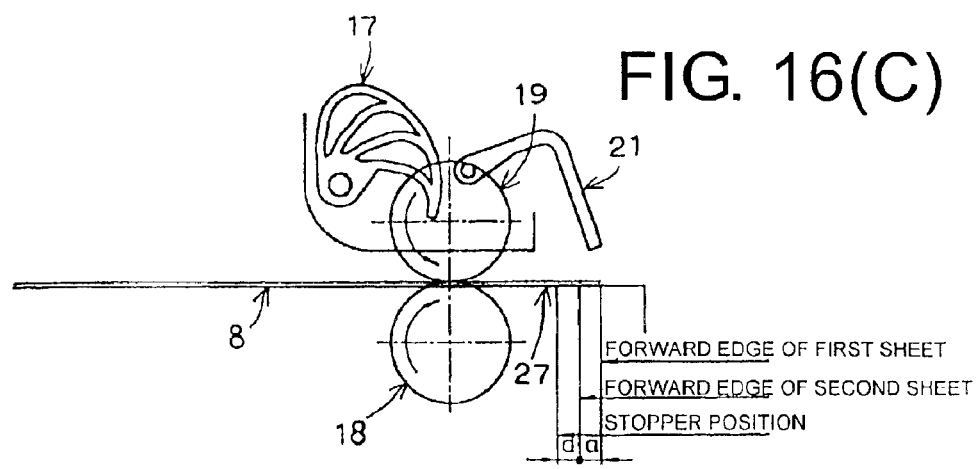

Then, the stopper 21 is moved to the retraction position. The first and second sheets nipped between the conveyance lower roller 18 and conveyance upper roller 19 are moved toward the stapling unit 30 by the offset a from the sidewall of the leg of the stopper 21 abutting against the forward edge of the second sheet. Then, the conveyance lower roller 18 and conveyance upper roller 19 stop rotating (see FIG. 16(C)). In this state, there is the offset a between the forward edge of the first sheet S and the forward edge of the second sheet S, and between the forward edge of the second sheet S and the sidewall of the leg of the stopper 21 where the forward edge of second sheet S abuts.

Figure 17A:
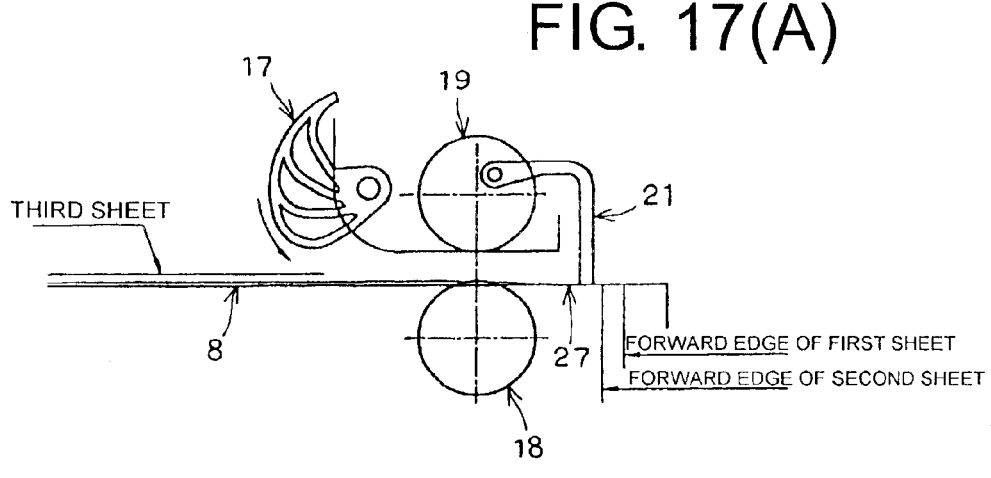

When the solenoid 22 is turned on, the first and second sheets are pressed with a bottom of the leg of the stopper 21 from above, and the conveyance upper roller 19 moves from the contact position to the spaced position. When the third sheet S is discharged into the process tray 8, the paddle motor 165 starts rotating (FIG. 17(A)).

Figure 17B:
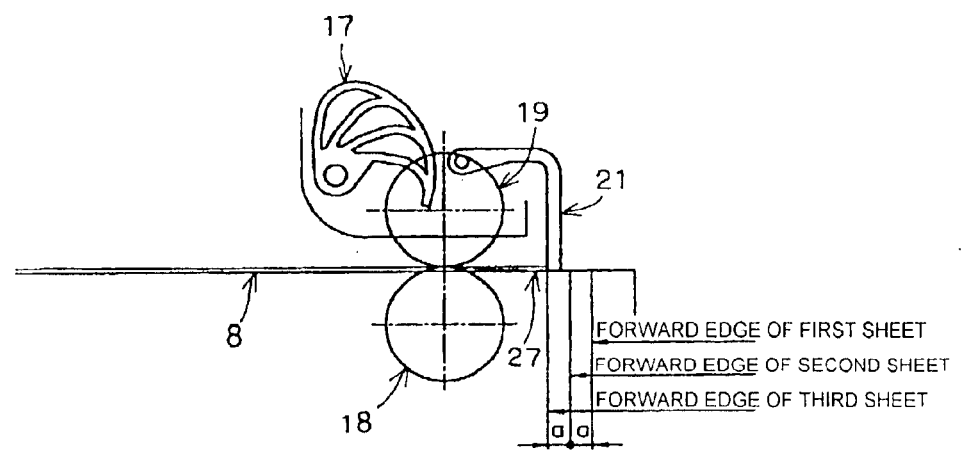

The paddle 17 rotates around the axis 17*a* by one revolution to move the third sheet S until the forward edge of the third sheet S abuts against the sidewall of the leg of the stopper 21 at the restraining position. The conveyance upper roller 19 moves from the spaced position to the contact position to nip the first, second and third sheets S with the conveyance lower roller 18 (see FIG. 17(B)).

In this state, there is the offset a between the forward edge of the first sheet S and the forward edge of the second sheet S, and between the forward edge of the second sheet S and the sidewall of the leg of the stopper 21 where the forward edge of third sheet S contacts. Similarly, the same offset process is repeated until the Y-th sheet S is processed in response to the input through the touch panel 147 by the operator.

Next, the stepping motor 70 is driven to move the sheet stack nipped between the conveyance upper roller 19 and conveyance lower roller 18 to the stapler unit 30. With this drive, the conveyance upper roller 19 and conveyance lower roller 18 convey the sheet stack to a position where the stitching position $L_Y$ is located at the head position of the head assembly 31 at the initial position while nipping the sheet stack. Then, the conveyance upper roller 19 and conveyance lower roller 18 stop. In this case, the stitching position $L_Y$ with respect to the forward edge of the first sheet is given as $(L+a)/2+\{a\times(Y-1)\}$ by substituting $X_1=X_2=\ldots=X_{Y-1}=W=a$ in Equation (1). The position information is then stored in the RAM as the folding position $L_Y$ after the calculation.

The stapling/folding motor 170 drives the head driving shaft 38 and anvil driving shaft 37 in the operational directions to perform the stitching operation. When the stitching operation is performed at several stitching positions, the stapler slide motor 42 is activated. The guide screw shafts 35 and 36 rotate to move the head assembly 31 and anvil assembly 32 to a predetermined position in a direction perpendicular to the sheet conveyance direction, and then the stitching operation is performed.

Then, to perform the folding operation, the conveyance motor 162 rotates in the reverse direction to rotate the upper roller movement cam 68 as in the saddle stitching mode. The stack conveyance upper roller 51 is lowered toward the stack conveyance lower roller 52 through the bearing holder 102. The sheet stack is thus nipped by the pulling spring 104. The conveyance upper roller 19 in the process tray 8 moves to the spaced position to release the sheet stack.

Figure 18A:
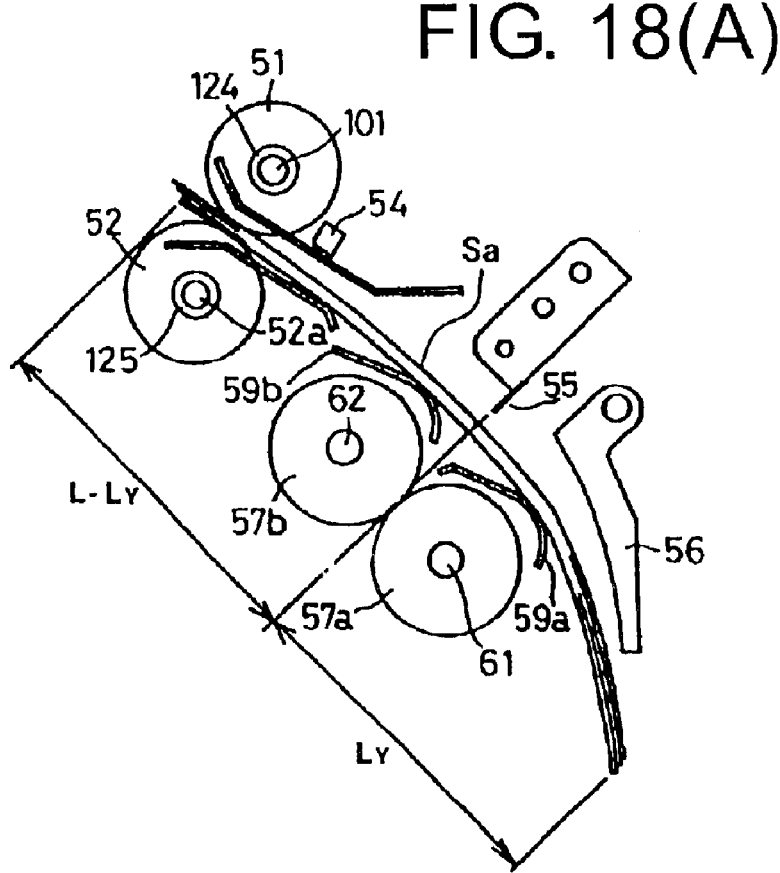

The conveyance motor 162 rotates the stack conveyance upper roller 51 and stack conveyance lower roller 52 to convey the sheet stack further in a downstream direction. During the conveyance, the control unit 149 slows and then stops the conveyance motor 162 in accordance with a signal detected by the edge detector sensor 54 and the information of the folding position $L_Y$ stored in the RAM so that the sheet stack is folded at the folding position $L_Y$. In this state, the forward edge of the sheet stack is suspended in the sheet stack passage 58 while nipped between the stack conveyance upper roller 51 and stack conveyance lower roller 52 (see FIG. 18(A)).

Figure 18B:
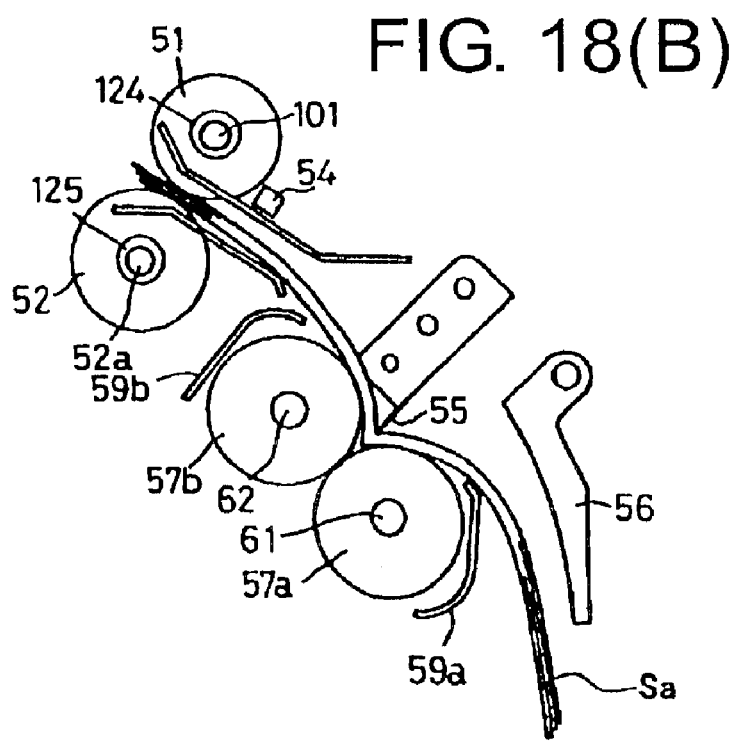

The stapling/folding motor 170 rotates in a direction opposite to that for the stitching operation. As shown in FIG. 18(B), the folding rollers 57a and 57b rotate in a direction to nip the sheet stack Sa while the pushing plate 55 is lowered. In synchronization with the lowering operation of the pushing plate 55, the backup guides 59a and 59b move to expose the circumferences of the folding rollers 57a and 57b toward the sheet stack Sa. When the pushing plate 55 is lowered, the sheet stack Sa is pulled between the folding rollers 57a and 57b. The pushing plate 55 moves away from the sheet stack Sa, and the sheet stack Sa is further folded between the folding rollers 57a and 57b.

The sheet stack Sa conveyed in the nipped state between the folding rollers 57a and 57b is then discharged into and stocked on the folded sheet stack discharge stacker 80. With the folded sheet pressure member 81 pressing the sheet stack Sa, the folded sheet stack (the booklet) is not opened and does not interfere with the next booklet.

After the start of the folding operation, when the pushing plate HP sensor 169 detects that the pushing plate 55 moves back and forth by a predetermined number of times according to the length of the sheet stack Sa in the sheet conveyance direction, the control unit 149 stops the stapling/folding motor 170. After the sheet stack Sa is nipped between the folding rollers 57a and 57b, the stack conveyance upper roller 51 is raised and spaced apart from the stack conveyance lower roller 52 to be ready for the next sheet stack.

In the offset saddle stitching mode, after pushing the sheet stack Sa into the folding rollers 57a and 57b, the pushing plate 55 moves to the pushing position again. The timing of folding the sheets between the folding rollers 57a and 57b and the timing of movement of the pushing plate 55 are set so that the pushing plate 55 does not contact both edges of the folded sheet stack Sa when the pushing plate 55 moves again to the pushing position. Therefore, even if the common driver, i.e. the stapling/folding motor 170, drives the pushing plate 55 and the folding rollers 57a and 57b, the sheet stack Sa is not damaged. Furthermore, the sheet post-processing device 2 can be made compact.

When the offset stapling mode is selected, the controller 149 performs the offset process and saddle stitching process as in the offset saddle stitching mode.

When the saddle stitching operation is completed, the stepping motor 70 drives the conveyance lower roller 18, conveyance upper roller 19, and conveyance belt 12 toward the lifting tray 90. Subsequent to the saddle stitching operation, the sheet stack is handed over to the pushing nail 13. The pushing nail 13 pushes and places the sheet stack on the lifting tray 90. Since the relationship of distance L1<distance L2 holds as shown in FIG. 5, the pushing nail 13 on the end face thereof in its upright position pushes the end of the sheet stack toward the lifting tray 90. No extra stress occurs in the sheet stack during movement.

When the sheet stack is placed on the lifting tray 90, the controller 149 causes the lifting tray motor 155 to rotate, thereby lowering the lifting tray 90 by a certain distance. The controller 149 then causes the lifting tray motor 155 to rotate in a reverse direction, thereby raising the lifting tray 90 to a position where the sheet surface sensor 93 detects the surface of a top sheet of the stack. The lifting tray 90 remains at this position until a next sheet stack is placed.

When the offset saddle mode is selected, the control unit 149 performs the offset process as in the offset saddle stitching mode. When the offset process is completed, the control unit 149 activates the stepping motor 70 to convey the sheet stack nipped between the conveyance upper roller 19 and conveyance lower roller 18 toward the folding unit 50. In parallel, the conveyance motor 162 rotates in the reverse direction to rotate the upper roller movement cam 68. The stack conveyance upper roller 51 is then lowered toward the stack conveyance lower roller 52 through the bearing holder 102. The sheet stack is thus nipped by the pulling spring 104. Then, the conveyance upper roller 19 in the process tray 8 is raised from the sheet stack, thereby releasing the sheet stack.

The conveyance motor 162 is activated to rotate the stack conveyance upper roller 51 and stack conveyance lower roller 52 to convey the sheet stack further in a downstream direction. During the conveyance, the control unit 149 slows and then stops the conveyance motor 162 in accordance with a signal detected by the edge detector sensor 54 and information of the folding position stored in the RAM so that the sheet stack is folded at the folding position $L_Y$ (see FIG. 18(A)).

The stapling/folding motor 170 rotates in a direction opposite to that for the saddle stitching operation. As shown in FIG. 18(B), the folding rollers 57a and 57b rotate in a direction to nip the sheet stack Sa, and the pushing plate 55 is lowered. In synchronization with the lowering operation of the pushing plate 55, the backup guides 59a and 59b move to expose the circumferences of the folding rollers 57a and 57b toward the sheet stack Sa. When the pushing plate 55 is lowered, the sheet stack Sa is pulled between the folding rollers 57a and 57b. The pushing plate 55 moves away from the sheet stack Sa, and the sheet stack Sa is further folded between the folding rollers 57a and 57b.

The sheet stack Sa conveyed in the nipped state between the folding rollers 57a and 57b is then discharged into and stocked on the folded sheet stack discharge stacker 80. With the folded sheet pressure member 81 pressing the sheet stack Sa, the folded sheet stack without the stitching is not opened and does not interfere with the next booklet.

After the start of the folding operation, when the pushing plate HP sensor 169 detects that the pushing plate 55 moves back and forth by a predetermined number of times according to the length of the sheet stack Sa in the sheet conveyance direction, the control unit 149 stops the stapling/folding motor 170. After the sheet stack Sa is nipped between the folding rollers 57a and 57b, the stack conveyance upper roller 51 is raised and moves away from the stack conveyance lower roller 52 to be ready for the next sheet stack.

Hereunder, advantages of the copying apparatus 1A of the embodiment of the present invention will be explained.

The copying apparatus 1A of the present invention includes the digital copying apparatus main unit 1 and the sheet post-processing device 2 which is detachably mounted on the digital copying apparatus main unit 1 and includes the conveyance unit 100, offset unit 20, stapler unit 30, and folding unit 50. Therefore, the sheet is post-processed in a variety of modes. In particular, the sheets are shifted with the edge of one page shifted from the edge of a next page as shown in FIG. 20 in the offset saddle stitching mode. The resulting booklet is easy to page turn. The sheet stack is saddle stitched but not folded in the offset stapling mode. Even if a number of sheet stacks containing sheets bearing identical images are placed, the overall thickness is small.

The sheet stacks are easy to transport, and after being transported, the sheet stacks may be manually folded at the stitch line. Resulting booklets are easy to turn the pages. In the offset saddle mode, the sheet stack is folded but not stitched. If any correction is required on an image recorded on a sheet, a new sheet may be substituted after manually folding the new one. The sheet stack is then manually stapled at the fold line, becoming a booklet easy to page turn.

Since the digital copying apparatus 1A of the present invention permits the offset process, resulting booklets are easy to turn pages even by a husky person with large fingers, a person who is obliged to turn pages using a single hand, and a person who has a crippled hand. The digital copying apparatus having such a function has a large industrial value from the standpoint of helping handicapped and aged people participating in corporate and social activities.

The digital copying apparatus 1A calculates the magnification at which the original images fit the image forming area of the size of the smallest size page (page 1) excluding the margins thereof (steps 312–316, steps 414–418, and steps 514–520), and then the original images at the calculated magnification are arranged on the sheet. The digital copying apparatus 1A is free from the drawback of conventional digital copying apparatuses that a portion of the original image is mutilated from the smallest size page (see FIGS. 21(B) and 21(C), FIGS. 23(B) and 23(C), and FIGS. 25(B) and 25(C), and FIGS. 26(B) and 26(C)).

Further, the digital copying apparatus 1A allows the user to select between the opposed-edge referenced image forming mode and stitch-line (fold-line) referenced image forming mode (step 320). Therefore, the image can be formed at a position desired by the user. As shown in FIG. 14(A), in the opposed-edge referenced image forming mode, the digital copying apparatus 1A produces a booklet in which the images are formed on the area spaced apart from the edge by the distance m. The user easily learns the content of the booklet while turning pages of the booklet.

In the stitch-line (fold-line) referenced image forming mode as shown in FIG. 14(B), the digital copying apparatus 1A produces a booklet in which the images are formed on the area spaced apart from the stitch line (the fold line) by the distance m. When the user copies an open booklet, two images juxtaposed on the same sheet of the booklet are copied onto sheets of the same size without introducing variations in the spacing between the two images. If all pages of the booklet produced using the opposed-edge referenced image forming mode are copied in the opened state thereof, the spacing between a pair of facing pages are different from that of another pair. Copied images are not aesthetically acceptable, and there is a possibility that a portion of the image is mutilated when a pair of particular facing pages is copied.

The pages of the sheets forming the sheet stack are associated with the image data (in step 310) in accordance with a table stored in a ROM listing the printing mode and the number of pieces of data (the number of images). The digital copying apparatus 1A is free from an error in the page order setting of the entire sheet stack.

As shown in FIG. 15(A) through FIG. 17(B), the sheets are successively shifted with the edge of one sheet shifted from the edge of a next sheet in the process of forming a sheet stack. The sheets are thus reliably and precisely shifted without being influenced by difference in friction between the sheets. Another offset mechanism may be applicable. For example, the edges of all sheets of a sheet stack may be restrained and aligned by a stopper, and the edges of the sheets are then moved using a cylinder for offsetting the edges. In this mechanism, however, a uniform offsetting of the sheets can not be performed because of a difference in friction between the sheets. The offset mechanism of the present invention is superior to such an offset mechanism.

In the sheet post-processing device 2, all sheets are held on the process tray 8 and first stack guide 27 with the stopper 21 at the restraining position when the paddle 17 urges second and subsequent sheets to the stopper 21. The offset posture of all sheets will be destroyed on the process tray 8 and first stack guide 27 if the conveyance upper roller 19 remains at the spaced position to permit the paddle 17 to urge the sheets toward the stopper 21, and all sheets remains in a non-held state on the process tray 8 and first stack guide 27. With all sheets held by the stopper 21 on the process tray 8 and first stack guide 27, the posture of the offset sheets is maintained. A sheet stack and booklet are free from offset posture destruction.

The conveyance lower roller 18 and conveyance upper roller 19, having the function of conveying the sheet stack to the stapler unit 30, also have the function of offsetting the sheet stack by the shift a in the offset process. The stopper 21 has the function of pressing the sheet stack from above with the bottom face thereof in addition to the function of restraining the sheets with the sidewall of the stopper 21. In this arrangement, the number of the components in the offset unit 20 is reduced. This arrangement implements a compact design not only in the offset unit 20 but also in the sheet post-processing device 2.

Mode setting is typically input by pressing the buttons on the touch panel 248 in the above description. Mode setting may also be input from an external apparatus such as the personal computer 210 or a manual button as already discussed. The image data is stored in the hard disk 961. Alternatively, the image data may be stored in a volatile memory such as a RAM in the controller 950, or a non-volatile memory such as an EEPROM other than the hard disk.

The digital copying apparatus 1A including the copying apparatus main unit 1 with the sheet post-processing device 2 attached thereto has been described. A sheet post-processing device commercially available as a separate unit provides the same advantages of this embodiment if the sheet post-processing device is provided with an interface for sending a control signal such as of sheet size information from a controller of a digital copying apparatus to a controller of the sheet post-processing device.

In accordance with the present embodiment, the operator inputs the shift using the touch panel 284 of the digital copying apparatus main unit 1. Alternatively, the operator may input the shift using an input unit (not shown) of the sheet-post processing device 2. In this case, a ROM of the controller 149 in the sheet-post processing device 2 may store the same program and program data as those of the controller 950 in the digital copying apparatus main unit 1. Alternatively, a portion of the program and program data may be sent from the controller 950 through an interface after switching on the controller 149.

The table is referenced in step 310 in the embodiments of the present invention. The number of sheets may be calculated based on the printing mode and the number of pieces of data (the number of images) of the image data, and the pages are then associated with the image data in response to the calculated number of sheets. This arrangement eliminates the need for storing the table. The amount of program data is thus reduced. The size of the smallest size page and the magnification are calculated in steps 312–316 using the equation. Alternatively, the calculation results may be stored in a table for later reference.

For simplicity of explanation, the operator selects the default shift a on the touch panel 248, and the controller 149 calculates the folding position and/or the stitching position. A plurality of such shifts, and the folding position and/or the stitching position may be calculated beforehand, and stored in a relational table. In response to a selected shift (distance of travel), the folding position and/or the stitching position may be read from the relational table. The shift is thus easily set or modified by storing such a relational table in a ROM.

In the above description, the sheet post-processing device 2 includes the stapler unit 30 and folding unit 50. A booklet is produced in the case where the sheet post-processing device 2 includes at least one of the stapler unit 30 and folding unit 50. With the other of the stapler unit 30 and folding unit 50 eliminated, the sheet post-processing device 2 becomes compact in design and low-cost.

The sheets are shifted in the sheet conveyance direction on the process tray 8 and first stack guide 27 in the above discussion. Alternatively, the sheets may be shifted in a direction perpendicular to the sheet conveyance direction. It is also perfectly acceptable if the sheets are shifted in both the sheet conveyance direction and the direction perpendicular to the sheet conveyance direction. A booklet is easy to turn the page in both directions.

The first stack guide 27 and process tray 8 are two separate units in the above description. Alternatively, the process tray 8 may extend to one side (the side of the stapler unit 30) by a length corresponding to the first stack guide 27.

Figure 19A:
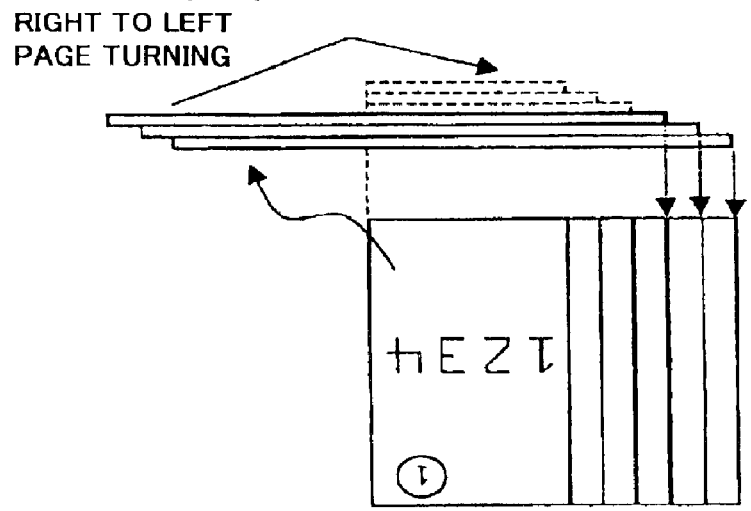
FIG. 19(A) is a view schematically showing a booklet turning right to left.
Figure 19B:
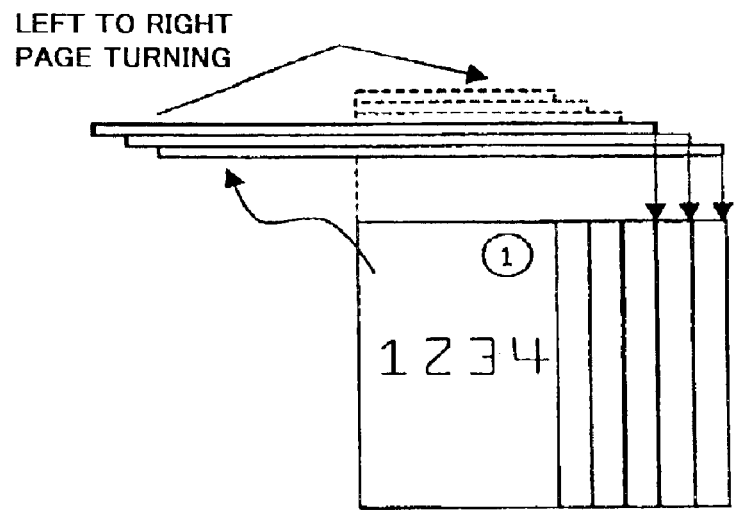
FIG. 19(B) is a view schematically showing a booklet turning left to right.

FIG. 19(A) shows a booklet for right to left page turning (a page turning operation may be easily performed by the right hand of the reader). Alternatively, the digital copying apparatus 1A may produce a booklet for left to right page turning (a page turning operation may be easily performed by the left hand of the reader) as shown in FIG. 19(B) by rotating the booklet by 180 degrees. The selection between such booklets may be performed by the open direction input switch for selecting the direction of page turning.

The digital copying apparatus 1A of the present invention forms the image spaced apart from the one page edge or the other page edge by the distance m1 equal to or larger than the offset a (m1≧a) and no image is formed on the offset area of each page (corresponding to m1). Each border between adjacent odd-number pages as the top surface of the pages appears distinct. The reader easily recognizes a position to which the user must place a finger for turning the page. The digital copying apparatus 1A thus produces a booklet which an individual with a weak eyesight may easily turn the page. The booklet has a neat appearance with no image formed on the offset area.

As shown in FIGS. 23(B) and 23(C), the images are formed on even-number pages such as page 10 and page 12 with a space of m1 from the forward edge (the one edge) of each page allowed, in addition to the odd-number pages. Each even-number page is the backside of the respective odd-number page (see FIG. 20). No images are formed on the offset portion on each page, and the border between adjacent pages is not obscured. On the even-number pages, however, the image may be formed on any area thereof. It is not necessary to form the image with the distance m1 from the sheet edge left blank. As shown in FIGS. 25(A)–25(C) and FIGS. 26(A)–26(C), the distance m2, shorter than the offset a (m1<a), from the one page edge or the other page edge is assured on the even-number page, which is the backside of each page of the booklet. The reader recognizes the image on each even-number page immediately after turning the page.

As shown in FIGS. 25(A)–25(C) and FIGS. 26(A)–26(C), the offset a, the distance m1 and the distance m2 are set to be 8 mm, 10 mm, and 15 mm, respectively. The present invention is not limited to these settings. The distances m1 and m2 and the offset a may be related in any way, such as m1>a>m2, as long as the image forming position is different from odd-number page to even-number page, the border between the adjacent odd-number pages becomes distinct, and the reader quickly recognizes the content of the images on the even-number pages.

Each sheet of the stack sheet has both side edges, i.e. the one edge and the other edge, from which the offset is arranged. In case of the booklet, each page has its free edge, and the image is formed with a predetermined distance left blanked from the corresponding free edge. The meaning of the word edge is thus different in context from the stack sheet to the booklet.

While the invention has been explained with reference o the specific embodiments of the invention, the explanation is illustrative and the invention is limited only by the appended claims.

What is claimed is:

1. An image forming apparatus for forming an image on each of different size pages of a booklet, comprising:
setting means for setting an image forming area on a page having a smallest size;
magnification modifying means for modifying a magnification of an original image on an original document so that the original image at the modified magnification fits the image forming area set by the setting means; and
image forming means for forming the original image at the magnification modified by the magnification modifying means on each of the different size pages of the booklet.

2. An image forming apparatus according to claim 1, wherein said setting means sets the image forming area at a position excluding a margin on the page having the smallest size.

3. An image forming apparatus according to claim 1, further comprising position control means for controlling the image forming means to form the original image at a predetermined position on each of the different size pages of the booklet at the magnification modified by the magnification modifying means.

4. An image forming apparatus according to claim 3, wherein said position control means controls the image forming means to form the original images next to each other on each of the different size pages of the booklet at the magnification modified by the magnification modifying means.

5. An image forming apparatus according to claim 3, wherein said position control means controls the image forming means to form the original image at the magnification modified by the magnification modifying means on each of the different size pages of the booklet with a predetermined space from free edge of each of the different size pages subjected to a stitching process or a folding process.

6. An image forming apparatus according to claim 3, wherein said position control means controls the image forming means to form the original image at the magnification modified by the magnification modifying means on each of the different size pages of the booklet with a predetermined space from an edge opposite to a free edge of each of the different size pages subjected to a stitching process or a folding process.

7. An image forming method comprising the steps of:
setting an image forming area on a page having a smallest size among different size pages of a booklet;
modifying a magnification of an original image on an original document so that the original image at the modified magnification fits the image forming area; and
forming the original image at the magnification modified in the step of modifying the magnification on each of the different size pages of the booklet.

8. An image forming method according to claim 7, wherein in said step of setting the image forming area, the image forming area is set at a position excluding a margin on the page having the smallest size.

9. An image forming method according to claim 7, further comprising the step of controlling a position of the original image at the modified magnification so that the original image is formed at a predetermined position on each of the different size pages of the booklet, in said step of forming the original image, the original image being formed at the predetermined position controlled in the step of controlling the position.

10. An image forming method according to claim 9, wherein in said step of controlling the position of the original image, the original images are formed next to each other on one of the different size pages of the booklet at the modified magnification.

11. An image forming method according to claim 9, wherein in said step of controlling the position of the original image, the original image is formed at the modified magnification on one of the different size pages of the booklet with a predetermined space from a free edge of each of the different size pages subjected to a stitching process or a folding process.

12. An image forming method according to claim 9, wherein in said step of controlling the position of the original image, the original image is formed at the modified magnification on one of the different size pages of the booklet with a predetermined space from an edge opposite to a free edge of each of the different size pages subjected to a stitching process or a folding process.

13. An image forming apparatus for forming an image on each of different size pages of a booklet with free edges of the pages shifted from each other, comprising:
storage means for storing input image data;
image forming means for forming the image on each of the different size pages according to the image data stored in the storage means;
detecting means for detecting shift distances among the free edges of the pages shifted with each other; and
control means for controlling the image forming means to form the image on each of the different size pages at a position away from the free edge of each page by a distance equal to or larger than the shift distance detected by the detecting means.

14. An image forming apparatus according to claim 13, wherein said control means controls the image forming means to form the image on an even-number page at a position away from the free edge by a distance smaller than that between the free edge and the image on an odd-number page.

15. An image forming apparatus comprising:
storage means for storing input image data;
image forming means for forming images on each of adjacent pages on one side of a sheet with at least one of a fold line and a stitch line to be formed later in between according to the image data stored in the storage means;
control means for controlling the image forming means to form the images on the pages at a position away from a edge of the sheet by a predetermined distance, said control means controlling the image forming means to form the image at a position away from an edge of an odd-number sheet by a predetermined distance when a sheet stack is folded along one of the fold line and the stitch line such that one edge of an innermost sheet of the sheet stack looks to project out of the other edge thereof; and
a sheet post-processing device including placement means for placing the sheets discharged with the images thereon, offset means for successively shifting the edges of the sheets from each other to form the sheet stack, and post-processing means for performing at least one of a folding process and a saddle stitching process on the sheet stack of the sheets shifted by the offset means.

16. An image forming apparatus according to claim 15, wherein said post-processing device performs at least the one of the folding process and the stitching process at a position closer to one edge of the sheet than to the other edge thereof.

17. An image forming apparatus according to claim 15, wherein said control means controls the image forming means to form the image on an odd-number page at a position different from that on an even-number page when the sheet stack is folded at at least one of the fold line and the stitch line such that one edge of an innermost sheet looks to project out of the other edge thereof.

18. An image forming apparatus according to claim 17, wherein said control means controls the image forming means to form the image on an even-number page at a position away from one edge or the other edge of the even-number page by a distance smaller than that between the image and one edge or the other edge on the odd-number page.

19. An image forming apparatus comprising:

storage means for storing input image data;

image forming means for forming images on each of adjacent pages on one side of a sheet with at least one of a fold line and a stitch line to be formed later in between according to the image data stored in the storage means;

control means for controlling the image forming means to form the images on the pages at a position away from an edge of the sheet by a predetermined distance; and a sheet post-processing device including placement means for placing the sheets discharged with the images thereon, offset means for successively shifting the edges of the sheets from each other to form a sheet stack, and post-processing means for performing at least one of a folding process and a saddle stitching process on the sheet stack of the sheets shifted by the offset means, wherein said offset means includes a restraining member situated adjacent to the placement means to be movable between a restraining position at which the restraining member restrains and aligns the edges of the sheets discharged into the placement means and a retraction position at which the restraining member is retracted from the restraining position; an urging member disposed adjacent to the placement means for urging the sheet discharged into the placement means toward the restraining member; and a sheet moving member situated adjacent to the placement means to be movable between a first position at which the sheet moving member nips the sheets on the placement means to move the sheets for a predetermined distance and a second position at which the sheet moving member is located away from the sheets on the placement means to allow the urging member to urge the sheets.

20. An image forming method comprising the steps of:

detecting a shift distance between edges of sheets shifted from each other in a booklet with different size pages; and forming an image on each of the sheets at a position away from the edge of each sheet by a distance equal to or larger than the shift distance.

21. An image forming method according to claim 20, wherein in said step of forming the image, the image is formed on each odd-number page of the booklet.

22. An image forming method comprising:

an image forming position setting step of setting a first image forming position on an odd-number page and a second image forming position on an even-number page of a booklet of different size pages with edges of the pages shifted from each other, said first image forming position being situated at a position different from that at the second image forming position; and an image forming step of forming images at the first image forming position and the second image position set in the image forming position setting step.

23. An image forming method according to claim 22, wherein in said image forming position setting step, the second image forming position is set at a position closer to one edge on the even-number page than that on the odd-number page.

* * * * *